US010028004B1

(12) United States Patent
Anderson

(10) Patent No.: US 10,028,004 B1
(45) Date of Patent: Jul. 17, 2018

(54) LIVE TELEVISION PROGRAM OVERRUN MANAGEMENT SYSTEM

(75) Inventor: Ryan Brady Anderson, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 808 days.

(21) Appl. No.: 12/612,936

(22) Filed: Nov. 5, 2009

(51) Int. Cl.
*H04N 21/262* (2011.01)
*H04N 21/218* (2011.01)
*H04N 21/2187* (2011.01)
*H04N 21/472* (2011.01)
*H04N 21/6332* (2011.01)
*H04N 21/65* (2011.01)

(52) U.S. Cl.
CPC ....... *H04N 21/2625* (2013.01); *H04N 21/218* (2013.01); *H04N 21/2187* (2013.01); *H04N 21/26291* (2013.01); *H04N 21/47214* (2013.01); *H04N 21/6332* (2013.01); *H04N 21/65* (2013.01)

(58) Field of Classification Search
CPC ............. H04N 21/2625; H04N 21/218; H04N 21/2187; H04N 21/26291; H04N 21/47214; H04N 21/6332; H04N 21/65
See application file for complete search history.

(56) References Cited

U.S. PATENT DOCUMENTS

| 6,711,743 | B1* | 3/2004 | Hong ............... H04N 21/42676 725/110 |
| 2004/0010807 | A1* | 1/2004 | Urdang et al. ................ 725/136 |
| 2004/0040035 | A1* | 2/2004 | Carlucci .......... H04N 21/23424 725/32 |
| 2006/0064721 | A1* | 3/2006 | Del Val et al. ................. 725/41 |
| 2006/0259925 | A1* | 11/2006 | Lemmons et al. .............. 725/39 |
| 2007/0136749 | A1* | 6/2007 | Hawkins et al. ............... 725/38 |
| 2008/0285943 | A1* | 11/2008 | Wang ................... H04N 21/262 386/296 |
| 2011/0078736 | A1* | 3/2011 | Thomas ............... H04N 21/252 725/40 |

* cited by examiner

*Primary Examiner* — Jeremy S Duffield
(74) *Attorney, Agent, or Firm* — Next IP Law Group; Benjamin A. Balser

(57) ABSTRACT

A system for compensating for the effect of a live television program airing beyond a previously determined end time on the provision of channel guides, pop up program reminders, and/or video recording of television programs by network interface devices of a subscription based television service provider. First data messages are generated and communicated by a computer of the live television program's source configured with messaging software. Upon receiving the first data messages, a service provider computer automatically generates and communicates second data messages to network interface devices located at subscribers' premises causing them to automatically (i) disable the generation of pop up program reminders and the performance of video recording, (ii) update stored channel guide, pop up program reminder, and video recording session schedule data to compensate for the overrunning live television program, and (iii) re-enable the generation of pop up program reminders and the performance of video recording.

19 Claims, 15 Drawing Sheets

FIG. 1
(PRIOR ART)

| CHANNEL GUIDE | | | |
|---|---|---|---|
| CHNL | 4:00 PM | 5:00 PM | 5:30 PM |
| 46 ESPN | U.S. OPEN TENNIS | SPORTS CENTER | PRO BOWLING |
| 47 ESPN2 | COLLEGE FOOTBALL | COLLEGE FOOTBALL | COLLEGE FOOTBALL |
| 48 FSSO | BASEBALL | BASEBALL | POKER TOURNAMENT |
| 49 GOLF | LPGA GOLF | LPGA GOLF | LPGA GOLF |

FIG. 2
(PRIOR ART)

TELEVISION PROGRAM

| ⌂ REMINDER | 4:55 PM |
|---|---|
| SPORTS CENTER<br>5:00-5:30 PM<br>Sports scores & information | 46<br>ESPN |

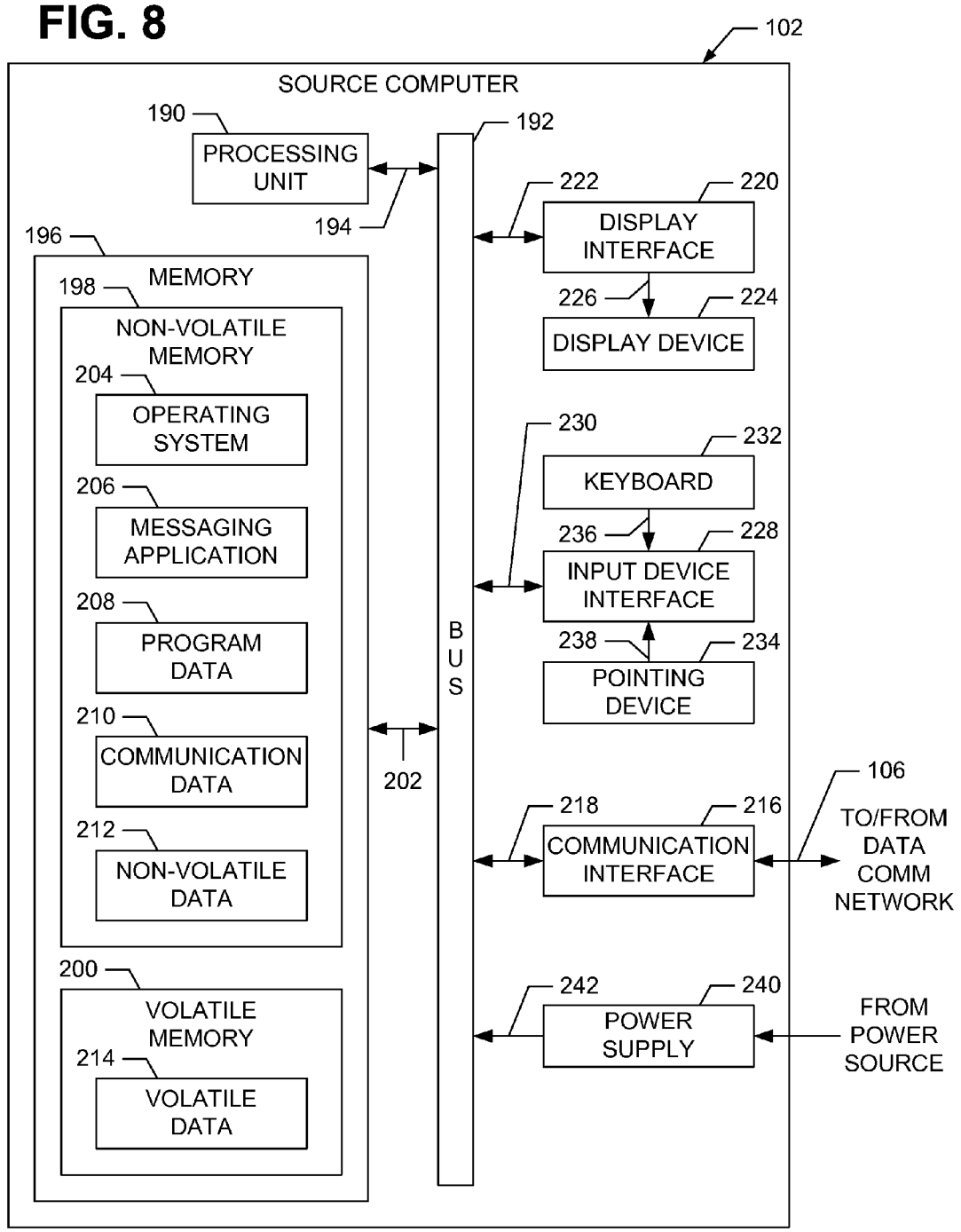

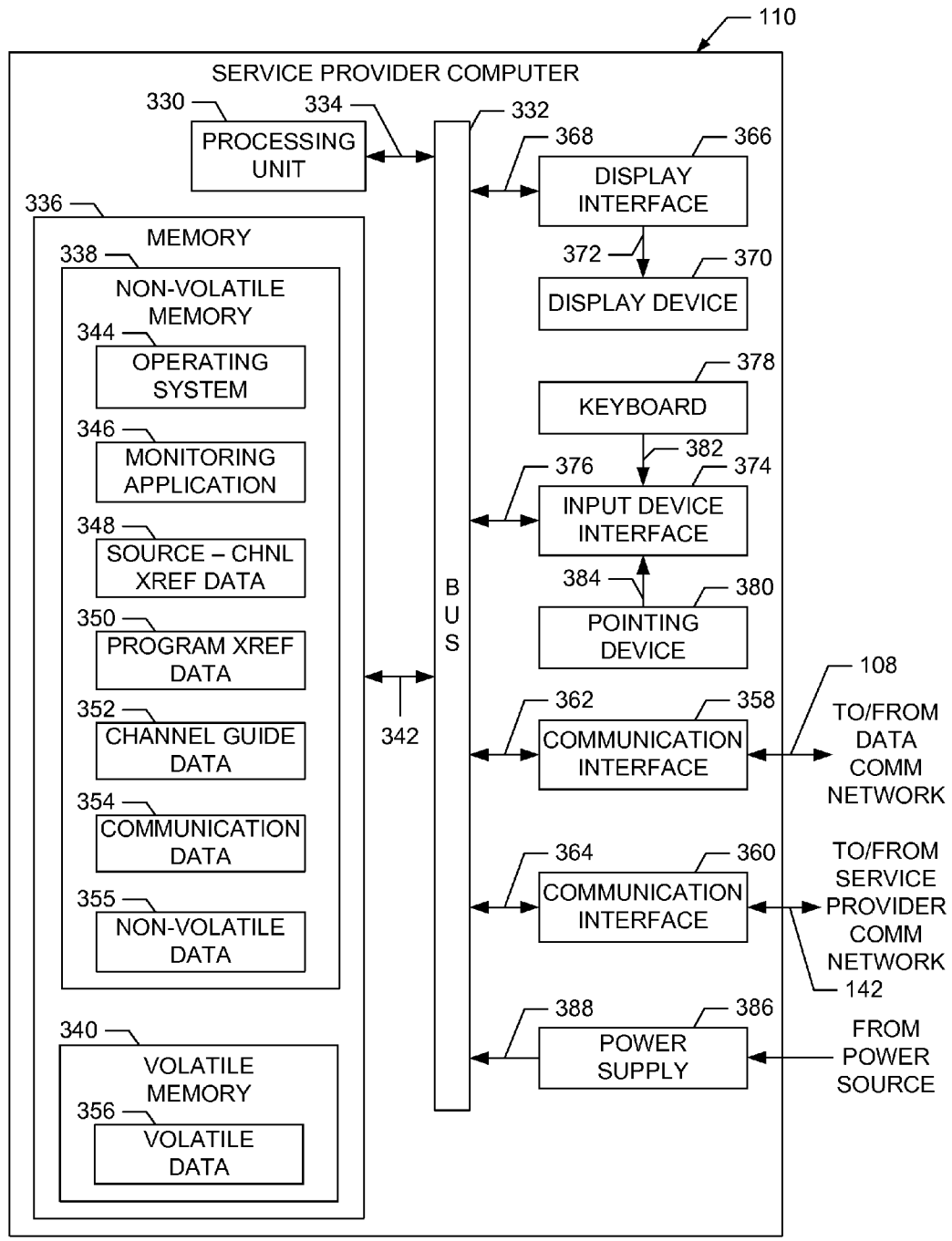

| SOURCE ID | SERVICE PROVIDER CHNL NO. | SERVICE PROVIDER CHNL NAME |
|---|---|---|
| 400 | 402 | 404 |

| SOURCE ID | SOURCE PROGRAM ID | SERVICE PROVIDER PROGRAM ID | PGM NAME | PGM DESC |
|---|---|---|---|---|
| 410 | 412 | 414 | 416 | 418 |

| SERVICE PROVIDER CHNL NO. | SERVICE PROVIDER CHNL NAME | PGM DATE | SERVICE PROVIDER PGM ID | PGM START TIME | PGM END TIME | PGM NAME | PGM DESC |
|---|---|---|---|---|---|---|---|
| 430 | 432 | 434 | 436 | 438 | 440 | 442 | 444 |

| NETWORK INTERFACE DEVICE ID | DEVICE TYPE CODE | SERIAL NO. | SUBSCRIBER ID | COMMUNICATION ADDRESS |
|---|---|---|---|---|
| 450 | 452 | 454 | 456 | 458 |

FIG. 24

| PGM ID | CHNL NO. | CHNL NAME | PGM DATE | PGM START TIME | PGM END TIME | PGM NAME | PGM DESC |
|---|---|---|---|---|---|---|---|
| 1 | 46 | ESPN | 9/1/09 | 2:00 PM | 5:00 PM | U.S. OPEN TENNIS | U.S. OPEN TENNIS TOURNAMENT |
| 2 | 46 | ESPN | 9/1/09 | 5:00 PM | 6:00 PM | SPORTS CENTER | SPORTS SCORES & INFORMATION |
| 3 | 46 | ESPN | 9/1/09 | 6:00 PM | 7:00 PM | PRO BOWLING | PRO BOWLERS TOUR IN AKRON, OHIO |

FIG. 25

| PGM ID | CHNL NO. | CHNL NAME | PGM DATE | PGM START TIME | PGM END TIME | PGM NAME | PGM DESC |
|---|---|---|---|---|---|---|---|
| 1 | 46 | ESPN | 9/1/09 | 2:00 PM | 6:00 PM | U.S. OPEN TENNIS | U.S. OPEN TENNIS TOURNAMENT |
| 2 | 46 | ESPN | 9/1/09 | 6:00 PM | 7:00 PM | SPORTS CENTER | SPORT SCORES & INFORMATION |
| 3 | 46 | ESPN | 9/1/09 | 7:00 PM | 8:00 PM | PRO BOWLING | PRO BOWLERS TOUR IN AKRON, OHIO |

LIVE TELEVISION PROGRAM OVERRUN MANAGEMENT SYSTEM

FIELD OF THE INVENTION

The present invention relates, generally, to the field of systems, including apparatuses and methods, for managing the overrun of live television programs beyond their previously determined end times.

BACKGROUND

Television service providers comprise businesses that provide television programs via cable, satellite, or other infrastructure and/or methods to customers who contract, or subscribe, for the receipt of such television programs. Hence, the customers are often referred to as subscribers. The television service providers generally have their own cable-based, satellite-based, and/or other infrastructures that are used to communicate the television programs to their subscribers. The television programs are, typically, received by the television service providers from a television network (including, but not limited to, the National Broadcasting Company (NBC), American Broadcasting Company (ABC), CBS Broadcasting, Inc. (CBS), Turner Broadcasting System, Inc. (TBS), and the Entertainment and Sports Programming Network (ESPN)) or other source and are re-broadcast via the providers' infrastructures to interface devices located at the subscribers' premises. The interface devices receive the television programs and communicate electrical signals representative of the television programs to connected display devices, such as television sets, thereby enabling viewing of the television programs by the subscribers.

The television service providers provide many services and features to subscribers in addition to basic television programming in order to enhance the usability of the basic television programming services. For example, many cable television service providers provide channel guide, pop up program reminders, and digital video recording services and/or features. The channel guides, as seen in FIG. 1, supply subscribers with the channel numbers, channel names, program names, and starting times for television programs that are available for viewing currently or later in the day. The pop up program reminders enable subscribers to select television programs for viewing in the future and to configure the interface devices at their premises to cause messages for the selected programs to pop up and be displayed on the subscribers' television sets at or near the selected programs' respective starting times. Through generation and display of the pop up messages at the bottom of subscribers' television screens as seen in FIG. 2, the subscribers may watch a television program on one channel and then be reminded that another television program on a different channel is about to begin. The digital video recording services are often provided via digital video recorders (DVRs) incorporated into the interface devices at subscribers' premises and enable subscribers to configure the interface devices to cause the recording of selected television programs during digital video recording sessions beginning and ending at their respectively scheduled start and end times. The subscribers may subsequently cause the interface devices to playback the recorded television programs for viewing on television sets connected to the interface devices.

The channel guides, pop up program reminders, and digital video recording features are each based on the starting times for television programs published by the television service providers. Unfortunately, when a television program is preceded by another television program comprising television coverage of a live event (such as, for example, a sporting event, a parade, or a politician's speech) received from a television network and re-broadcast by the television service provider on a channel associated with the television network, the starting time for the subsequent program may be later than originally anticipated and published due to the preceding program running longer than expected. As a consequence, the starting times for all subsequent programs displayed in the channel guide for the channel are often wrong. Additionally, if a subscriber has previously set up a pop up program reminder for a subsequent program on the channel, then the corresponding pop up reminder message will be generated at the wrong time. Similarly, if a subscriber has previously set up a digital video recording session to start at a subsequent program's originally published starting time, then the digital video recording session will start at the wrong time.

Therefore, there exists a need in the industry for apparatuses and methods that enable a television network or source of a television program corresponding to a live event to inform downstream television service providers that the live event is running longer than originally anticipated, to inform downstream television service providers when the television program corresponding to the live event has ended, and to automatically cause cable channel guides, pop up program reminders, and digital video recording sessions to be adjusted, re-configured, or re-programmed accordingly.

SUMMARY

Broadly described, the present invention comprises a system, including apparatuses and methods, for automatically compensating for the effects of a live television program continuing to air beyond, or overrunning, a previously determined end time on the provision, by network interface devices of a subscription based television service provider, of channel guides, pop up program reminders, and/or digital video recording of television programs for later playback. According to the example embodiment described herein, first data messages are generated by a computer of the live television program source and communicated to a service provider computer. The first data messages comprise data informing the service provider computer of the overrun of the live television program. In response thereto, the service provider computer generates and communicates second data messages to network interface devices located at subscribers' premises causing the network interface devices to update channel guide, pop up program reminder, and/or video recording session schedule data stored thereat to compensate for the overrunning live television program. The second data messages further cause the network interface devices to disable and re-enable the generation of pop up reminder messages and, if a network interface device is configured for video recording, to disable and re-enable the performance of video recording.

Advantageously, the system enables the automatic updating of channel guide data, pop up program reminder data, and video recording session schedule data, if any, stored at network interface devices absent user or subscriber intervention. By automatically updating such data, previously configured pop up program reminders and video recording sessions, if any, are generated or performed by the network interface devices at times appropriate for and taking into account the delay caused to, the airing of subsequent television programs by the overrunning live television program.

Other advantages and benefits of the present invention will become apparent upon reading and understanding the present specification when taken in conjunction with the appended drawings.

BRIEF DESCRIPTION OF THE DRAWINGS

FIG. 1 displays a schematic representation of a prior art channel guide.

FIG. 2 displays a schematic representation of a prior art pop up program reminder.

FIG. 8 displays a block diagram representation of a source computer of the live television program overrun management system in accordance with an example embodiment of the present invention.

FIG. 13 displays a block diagram representation of a service provider computer of the live television program overrun management system in accordance with an example embodiment of the present invention.

FIG. 14 displays a schematic representation of source-channel cross reference data stored by a service provider computer of the live television program overrun management system in accordance with an example embodiment of the present invention.

FIG. 15 displays a schematic representation of program cross reference data stored by a service provider computer of the live television program overrun management system in accordance with an example embodiment of the present invention.

FIG. 16 displays a schematic representation of channel guide data stored by a service provider computer and a network interface device of the live television program overrun management system in accordance with an example embodiment of the present invention.

FIG. 17 displays a schematic representation of communication data stored by a service provider computer of the live television program overrun management system in accordance with an example embodiment of the present invention.

FIG. 24 displays a schematic representation of a portion of sample channel guide data of the live television program overrun management system at a first time before the overrunning of a live television program in accordance with an example embodiment of the present invention.

FIG. 25 displays a schematic representation of a portion of sample channel guide data of the live television program overrun management system at a second time after the overrunning of a live television program in accordance with an example embodiment of the present invention.

DETAILED DESCRIPTION OF THE DRAWINGS

Figure 3:
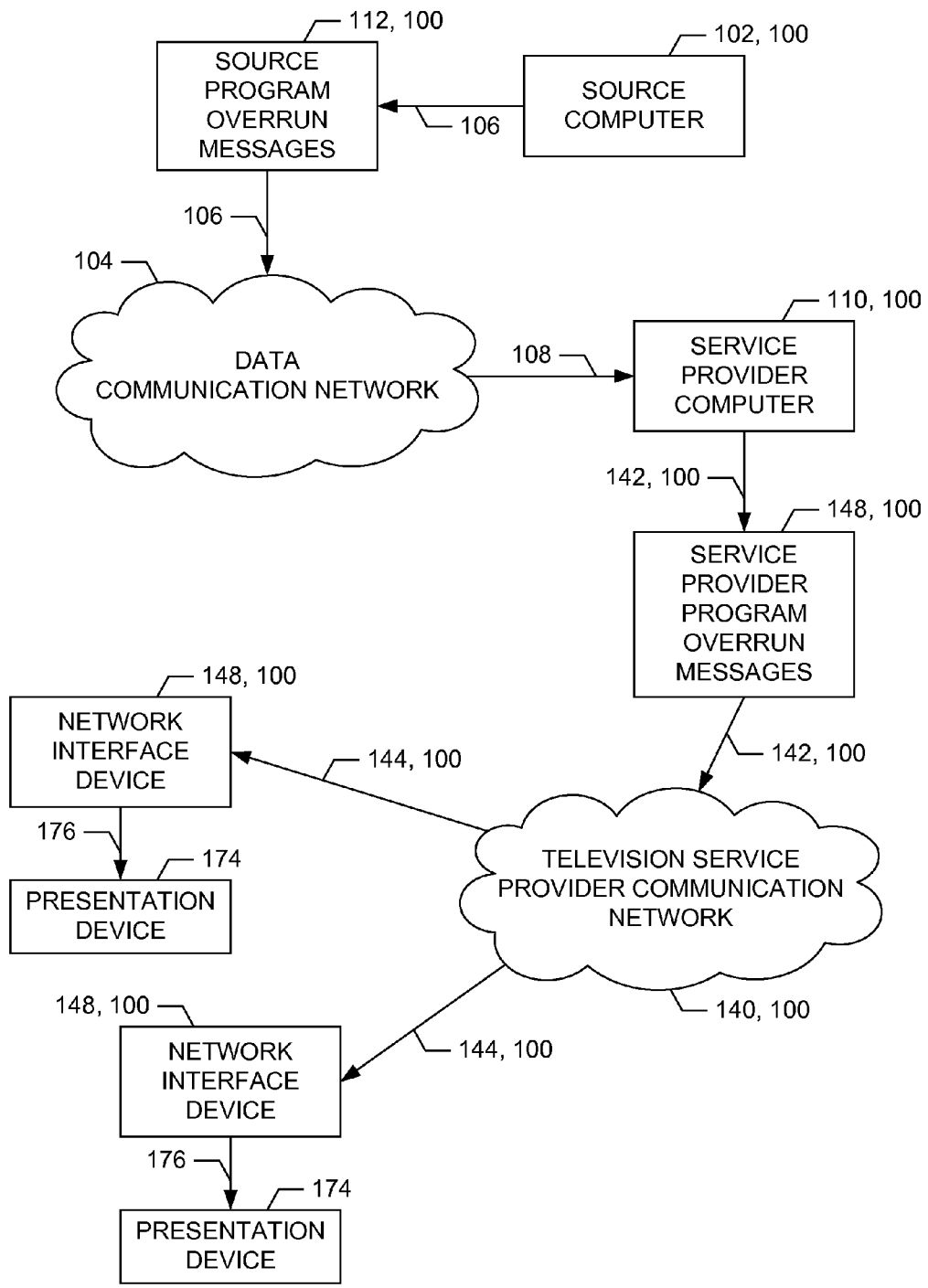
FIG. 3 displays a block diagram representation of a live television program overrun management system and environment therefor in accordance with an example embodiment of the present invention.

Referring now to the drawings in which like numerals represent like elements or steps throughout the several views, FIG. 3 displays a block diagram representation of components of and an environment for a live television program overrun management system 100, according to an example embodiment, for automatically managing and mitigating the adverse downstream effects on television service providers and their subscribers caused by the overrunning of a live television program beyond its originally anticipated end time. More specifically, the live television program overrun management system 100 (also sometimes referred to herein as the "system 100") causes the automatic adjustment and updating of channel guides to reflect the later start and end times for television programs available for viewing after the overrunning live television program. The system 100 also causes the automatic temporary disabling of pop up program reminders and digital video recording sessions for programs scheduled to occur at times after the originally anticipated end time of an overrunning live television program, the automatic adjustment and updating of the start and end times, as applicable, for such pop up program reminders and digital video recording sessions, and the automatic re-enabling of such pop up program reminders and digital video recording sessions after the adjustment and updating of their respective start and end times, as the case may be.

The system 100, as illustrated in FIG. 3 and described in more detail herein, includes apparatuses and methods that generate and communicate appropriate program overrun messages related to an overrunning live television program and/or that cause the actions described herein in response to receiving such messages. According to the example embodiment, the system 100 comprises one or more appropriately configured television program source computers 102 that are communicatively connected, via a data communication network 104 and communication links 106, 108, to appropriately configured television service provider computers 110. Each television program source computer 102 is, generally, associated with and/or operated by a single respective television network or other source of television programs provided to television service providers. For ease of description, the television networks or other sources of television programs are often referred to herein as "sources" and the television program source computers 102 are often referred to herein as "source computers 102". It should be appreciated that each television network or other source of television programs may provide, distribute, and/or source television programs (including, but not limited to, live television programs) to one or more television service provider. Each television service provider computer 110 is, typically, associated with and/or operated by a single respective television service provider that communicates television programs and provides related services to its subscribers via its service provider communication network 140. The television service provider may include, for example and not limitation, a cable television service provider, satellite television service provider, and/or other television service provider. For ease of description, the television service providers are often referred to herein as "service providers" and the television service provider computers 110 are referred to herein as "service provider computers 110".

The data communication network 104 and communication links 106, 108 include infrastructure appropriate to communicate messages, information, data, and/or signals between each source computer 102 and the service provider computers 110. The data communication network 104 may comprise, for example, the Internet and/or other existing or future, public or private communication network(s) capable of bi-directionally communicating messages, information, data, and/or signals. Communication links 106, 108 may comprise, for example, wired and/or wireless communication paths that communicate messages, information, data, and/or signals using electrical, optical, microwave, magnetic, satellite, and/or other technology available now or in the future.

Each of the system's source computers 102 is configured to generate and communicate source program overrun messages 112 to the system's service provider computers 110 via data communication network 104 and communication links 106, 108. The source program overrun messages 112 comprise notice messages 112A that are generated and communicated to notify each service provider and its respective service provider computer 110 when a source determines that one of its live television programs will overrun its originally scheduled end time. The source program overrun messages 112 further comprise program end messages 112B that are generated and communicated to provide each service provider and its respective service provider computer 110 with a new end time for an overrunning live television program.

Figure 4:
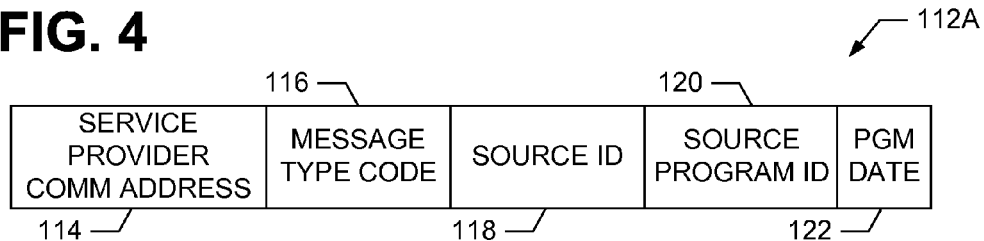
FIG. 4 displays a schematic representation of a source notice message of the live television program overrun management system in accordance with an example embodiment of the present invention.

Each notice message 112A, as depicted schematically in FIG. 4, comprises a plurality of data elements including a service provider communication address 114, a message type code 116, a source identifier 118, a source program identifier 120, and a program date 122. The service provider communication address 114 includes data uniquely associated with the service provider computer 110 for which the notice message 112A is intended and uniquely identifying such service provider computer 110 to the source computer 102, data communication network 104, and communication links 106, 108 so as to enable the delivery of the notice message 112A to the service provider computer 110. The service provider communication address 114 may comprise, for example and not limitation, an Internet protocol (IP) address. The message type code 116 includes data uniquely identifying the message as a notice message 112A rather than as a program end message 112B. The source identifier 118 comprises data uniquely associated with and identifying the source responsible for sending the message 112A and for the overrunning live television program. The source program identifier 120 includes data assigned and used by the source to uniquely identify the overrunning live television program to which the notice message 112A pertains. The program date 122 comprises data corresponding to and representative of the calendar date on which the overrunning live television program is airing. The program date 122 is included in the notice message 112A to distinguish the overrunning live television program from other television programs that may have the same television program identifier 120, but air on different dates.

Figure 5:
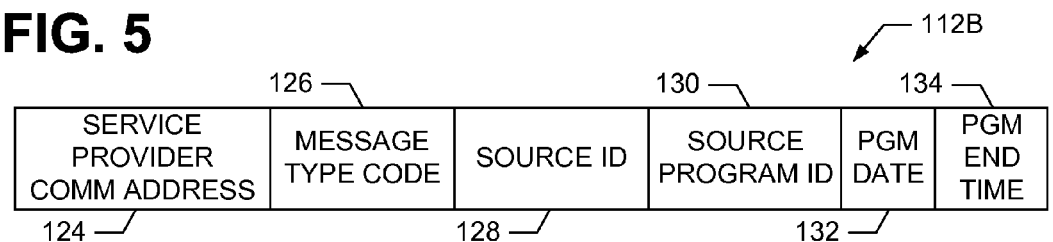
FIG. 5 displays a schematic representation of a source program end message of the live television program overrun management system in accordance with an example embodiment of the present invention.

Each program end message 112B, as illustrated schematically in FIG. 5, comprises a plurality of data elements including a service provider communication address 124, a message type code 126, a source identifier 128, a source program identifier 130, a program date 132, and a program end time 134. The service provider communication address 124, message type code 126, source identifier 128, source program identifier 130, and program date 132 are substantially the same as their counterparts present in each notice message 112A with the exception that they pertain to a program end message 112B for an overrunning live television program instead of a notice message 112A for the same overrunning live television program. Thus, for example, the message type code 126 includes data uniquely identifying the message as a program end message 112B rather than as a notice message 112A. However, the source identifier 128, source program identifier 130, program date 132 have the same values as their counterpart source identifier 118, source program identifier 120, and program date 122 present in a notice message 112A for the same television program. As described above, each program end message 112B includes a program end time 134 in addition to its other data elements. The program end time 134 comprises a new end time established by the source for the overrunning live television program and indicates when the program will end.

Referring back to FIG. 3, each service provider computer 110 is communicatively connected, via the service provider's respective service provider communication network 140 and communication links 142, 144, to appropriately configured network interface devices 146 located at the premises of respective subscribers of the service provider. The service provider communication network 140 and communication links 142, 144 include infrastructure appropriate to communicate data corresponding to television programs, movies, and other multimedia content in addition to messages, information, other data, and/or signals between the service provider computer 110 and the network interface devices 146. As alluded to briefly above, the service provider communication network 140 generally comprises a communication network owned and operated by the service provider that owns and operates the corresponding service provider computer 110. Similarly, communication links 142, 144 are generally owned and operated by the service provider that owns and operates the corresponding service provider computer 110. The service provider communication network 140 and communication links 142, 144 may comprise wired and/or wireless communication paths for the communication of messages, information, data, and/or signals of the television service provider using electrical, optical, microwave, magnetic, satellite, and/or other technology available now or in the future.

Each service provider computer 110 is adapted to receive source program overrun messages 112 from source computers 102 and, in response thereto, to generate and communicate service provider program overrun messages 148 to all downstream network interface devices 146 via a respectively associated service provider communication network 140 and communication links 142, 144. The service provider program overrun messages 148 comprise notice messages 148A that are respectively generated and communicated, upon receipt of a corresponding notice message 112A, to the network interface devices 146 to provide notification that a live television program on a particular channel will overrun its originally scheduled end time and to cause the temporary disabling of pop up program reminders and digital video recording sessions by the network interface devices 146 for television programs following the overrunning live television program on the same channel. The service provider program overrun messages 148 further comprise program update messages 148B that are generated and communicated, upon receipt of a corresponding program end message 112B, to the network interface devices 146 to supply updated information for each television program originally scheduled to air on the channel of, and after, the overrunning live television program, to trigger and control the updating of channel guide data, pop up program reminder data, and digital video recording session schedule data stored by the network interface devices 146, and to cause the re-enabling of pop up program reminders and digital video recording sessions for television programs airing on the channel of, and after, the overrunning live television program.

Figure 6:
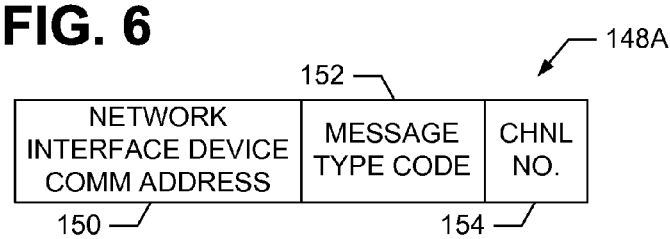
FIG. 6 displays a schematic representation of a service provider notice message of the live television program overrun management system in accordance with an example embodiment of the present invention.

Each service provider notice message 148A, as depicted schematically in FIG. 6, comprises a plurality of data elements including a network interface device communication address 150, a message type code 152, and a channel number 154. The network interface device communication address 150 comprises a communication address uniquely associated with a network interface device 146 communicatively connected to the service provider communication network 140. The network interface device communication address 150 may, according to the example embodiment, comprise a media access control (MAC) address uniquely associated with each network interface device 146 by the manufacturer thereof. Through use of a network interface device communication address 150 in each service provider notice message 148A, a service provider computer 110 may specifically address each service provider notice message 148A for receipt only by the particular network interface device 146 uniquely associated with the network interface device communication address 150 present in the message 148A. The message type code 152 includes data uniquely identifying the message as a notice message 148A rather than as a program update message 148B. The channel number 154 comprises data uniquely identifying the television channel to which the notice message 148A applies and for which pop up program reminders and digital video recording sessions by the network interface devices 146 are to be temporarily disabled for television programs following the overrunning live television program.

Figure 7:
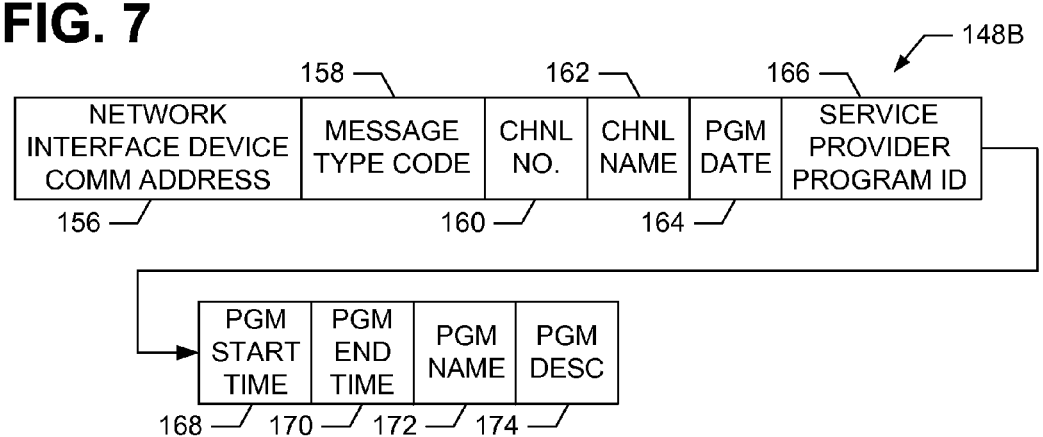
FIG. 7 displays a schematic representation of a service provider update message of the live television program overrun management system in accordance with an example embodiment of the present invention.

Each service provider program update message 148B, as illustrated schematically in FIG. 7, includes a plurality of data elements comprising a network interface device communication address 156, a message type code 158, a channel number 160, a channel name 162, a program date 164, a service provider program identifier 166, a program start time 168, a program end time 170, a program name 172, and a program description 174. The network interface device communication address 156 is substantially similar to the network interface device communication address 150 of each service provider notice message 148A and comprises a communication address uniquely associated with a network interface device 146 communicatively connected to the service provider communication network 140. The network interface device communication address 156 may, according to the example embodiment, comprise a media access control (MAC) address uniquely associated with each network interface device 146 by the manufacturer thereof. Similar to each service provider notice message 148A, inclusion of a network interface device communication address 156 in each service provider program end message 148B allows a service provider computer 110 to specifically address each service provider program end message 148B for receipt only by the particular network interface device 146 uniquely associated with the network interface device communication address 156 present in the message 148B.

The message type code 158 of each service provider program update message 148B comprises data uniquely identifying the message as a program update message 148B rather than as a notice message 148A and, more particularly, as an initial, intermediate, or final program update message 148B. An initial program update message 148B, when received by a network interface device 146, causes the network interface device 146 to initiate a process of updating channel guide data, pop up program reminder data, and digital video recording session schedule data using data present in and provided by the initial program update message 148B. An intermediate program update message 148B, when received by a network interface device 146, causes the network interface device 146 to continue the process of updating channel guide data, pop up program reminder data, and digital video recording session schedule data using the data present in and supplied by the intermediate program update message 148B. A final program update message 148B, when received by a network interface device 146, causes the network interface device 146 to complete the process of updating channel guide data, pop up program reminder data, and digital video recording session schedule data using the data present in and provided by the final program update message 148B and to re-enable pop up program reminders and digital video recording sessions for television programs airing on the channel of, and after, the overrunning live television program.

The channel number 160 of each program update message 148B comprises data uniquely identifying the service provider television channel to which the program update message 148B is applicable. The channel name 162 includes data corresponding to a textual name associated with the channel number 160. For example and not limitation, a program update message 148B might include data identifying the channel to which the program update message 148B applies as "46" and data corresponding to an associated textual name as "ESPN". The program date 164 comprises data corresponding to and representative of the calendar date to which the program update message 148B applies and for which channel guide data, pop up program reminder data, and digital video recording session schedule data is to be updated using program related data present in the program update message 148B. Inclusion of the program date 164 enables each network interface device 146 to distinguish between television programs airing on different dates, but having the same service provider program identifier 166. The service provider program identifier 166 includes data previously assigned by the service provider to uniquely identify a television program provided for viewing by subscribers, for which channel guide data, pop up program reminder data, and digital video recording session schedule data may be stored by the network interface device 146, and for which updating is to be performed by the network interface device 146. The program start time 168, program end time 170, program name 172, and program description 174 comprise data corresponding to the new start time, end time, textual name, and textual description, respectively, for the television program identified by the service provider program identifier 166 of the program update message 148B.

Referring back to FIG. 3, each network interface device 146 is communicatively connected to a respective presentation device 176 via a respective communication link 178. The presentation device 176 may comprise, for example and not limitation, a television set, monitor, or other device for presenting visible images representative of received signals. Each network interface device 146 is adapted to receive data corresponding to television programs, movies, and other multimedia content from the service provider via a respective service provider communication network 140 and to produce and deliver signals representative thereof to the presentation device 176 over a communication link 178. Each network interface device 146 is also adapted to: receive and store channel guide data; receive input from a subscriber of the service provider configuring the generation of pop up program reminders for, and the performance of digital video recording for, television programs supplied by the service provider for viewing; store pop up reminder data and digital video recording session schedule data; cause the display of a channel guide on the presentation device 176 using stored channel guide data; generate and cause the display of pop up reminders on the presentation device 176 using stored pop up reminder data; and perform digital video recording of television programs using digital video recording session schedule data.

Still further, each network interface device 146 is adapted to receive notice messages 148A and, upon the receipt thereof, to temporarily disable the generation of pop up program reminders and the performance of digital video recording sessions in accordance with the notice messages 148A. Each network interface device 146 is additionally adapted to receive program update messages 148B and, in response thereto, to update stored channel guide data, pop up reminder data, and digital video recording session schedule data using data present in the program update messages 148B, and to re-enable the generation of pop up program reminders and the performance of digital video recording sessions.

FIG. 8 displays a block diagram representation of a source computer 102 of a television program source according to an example embodiment. The source computer 102 is configured with a messaging application 206 that enables a user thereof to (i) view a list of television programs for the then current date that are provided by the source to downstream service providers, (ii) select or identify a live television program that is overrunning, or expected to overrun, its originally scheduled end time, and (iii) to cause the generation and communication of source program overrun messages 112 necessitated by the overrunning live television program to downstream service providers that receive television programs from the source. The source program overrun messages 112 are described in more detail above with reference to FIGS. 4 and 5. The source computer 102 also receives and stores program data 208 including information and/or data for each television program provided by the source to downstream service providers. Additionally, the source computer 102 receives and stores communication data 210 comprising information and/or data for each service provider computer 110 that enables the addressing and delivery of source program overrun messages 112 to each service provider computer 110 when appropriate. It should be remembered that, in accordance with the example embodiment, each source has a source computer 102.

Each source computer 102 comprises one or more processing unit(s) 190 that are adapted to execute computer software instructions of an operating system 204 and other computer software as required to provide the functionality described herein. The processing unit(s) 190 may include, but not be limited to, microprocessors or other similar components. Each processing unit 190 is connected to a bus 192 by bi-directional communication paths 194 for the bi-directional communication of address, data and control signals with the bus 192. The bus 192 includes a plurality of address, data and control electrical signal paths as appropriate to communicate address, data and control electrical signals between the various components of the source computer 102.

Each source computer 102 further comprises a memory 196, including non-volatile memory 198 and volatile memory 200. The memory 196 is communicatively connected to bus 192 for the bi-directional communication of computer software instructions, addresses, data and control signals with the bus 192 and other components connected to the bus 192, through one or more bi-directional communication paths 202. Non-volatile memory 198 generally stores information and/or data that will not be lost when electrical power to the non-volatile memory 198 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 200 typically stores information and/or data for a temporary period of time, as such information and/or data that will be lost when electrical power is no longer supplied to the volatile memory 200. Examples of volatile memory include, but are not limited to, non-battery backed up random access memory devices.

In accordance with the example embodiment, non-volatile memory 198 stores a plurality of computer software instructions of an operating system 204 that, when delivered to and executed by a processing unit 190, enable the processing unit 190 and other source computer components to perform various actions and provide the basic functionality necessary to implement the methods described herein. Non-volatile memory 198 also stores computer software instructions of a messaging application 206, which when communicated to and executed by a processing unit 190, causes the source computer 102 to operate according to the messaging application 206, thereby implementing the methods and functions of the messaging application 206 described in more detail below. Additionally, non-volatile memory 198 stores program data 208 for the television programs provided to service providers by the source and communication data 210 associated with a service provider computer 110 of each service provider that receives television programs from the source. The program and communication data 208, 210 are described in more detail below. In addition, non-volatile memory 198 stores non-volatile data 212 that is used by the processing unit 190 during execution of the operating system 204 and the messaging application 206.

Volatile memory 200 stores volatile data 214 that is created and/or used by the operating system 204 or messaging application 206 during execution. Volatile data 214 may include, for example, program data 208 retrieved from non-volatile memory 198, communication data 210 retrieved from non-volatile memory 198, source program overrun messages 112 generated for communication to the downstream service provider computers 110, and intermediate data produced by execution of the operating system 204 and/or messaging application 206.

Each source computer 102 also comprises a communication interface 216 that connects to bus 192 via respective communication paths 218 for the bi-directional communication of address, data and control signals therebetween. The communication interface 216 connects the source computer 102 for the bi-directional communication of messages, information, data, and/or signals with service provider computers 110 via communication links 106, data communication network 104, and communication links 108.

In accordance with example embodiment, each source computer 102 additionally comprises a display interface 220 connected to bus 192 via communication path 222 for the bi-directional communication of addresses, data and/or control signals with the bus 192 and various components connected to the bus 192. A display device 224 is connected to the display interface 220 via communication path 226 for the receipt and display of video or image signals received from the display interface 220. Similarly, an input device interface 228 is connected to bus 192 via communication path 230 for the bi-directional communication of addresses, data and/or control signals with the bus 192 and various components connected to the bus 192. A keyboard 232 and pointing device 234 are, respectively, connected to the input device interface 228 via respective communication paths 236, 238 for the receipt of input from a user of the source computer 102 and for the communication of data representative of such input to the input device interface 228. A power supply 240 is connected to bus 192 via electrical signal path 242 to supply electrical energy to the bus 192 and components connected to the bus 192 that is necessary for their operation.

Figure 9:
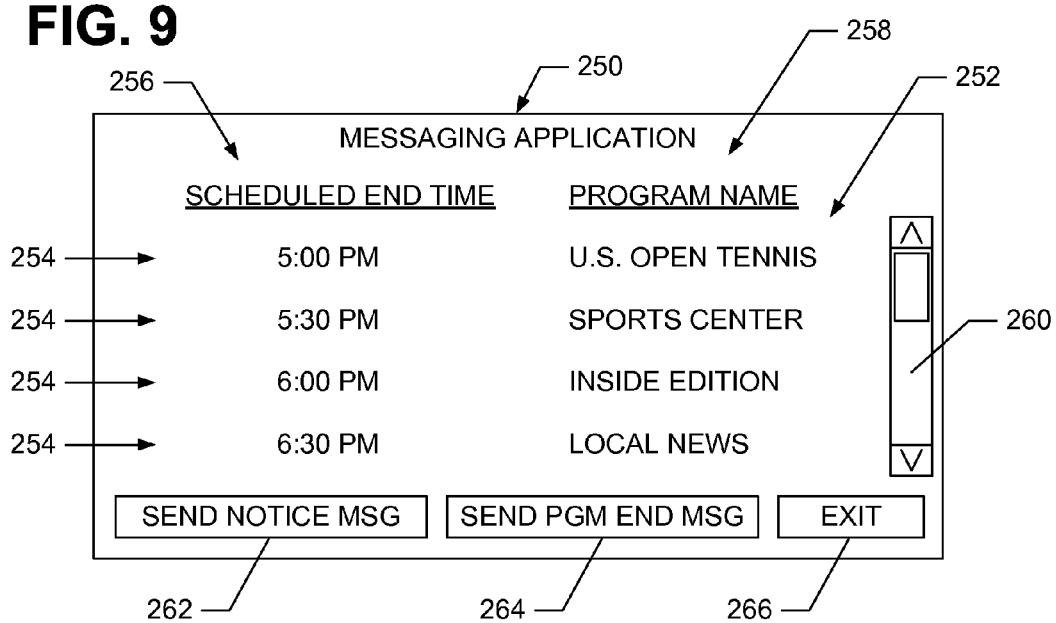
FIG. 9 displays a schematic representation of a user interface window of a messaging application of the live television program overrun management system in accordance with an example embodiment of the present invention.

As briefly described above, the messaging application 206 enables a user thereof to (i) view a list of television programs for the then current date that are provided by the source to downstream service providers, (ii) select or identify a live television program that is overrunning, or expected to overrun, its originally scheduled end time, and (iii) to cause the generation and communication of source program overrun messages 112 necessitated by the overrunning live television program to downstream service providers that receive television programs from the source. FIG. 9 displays a schematic representation of a user interface window 250 of the messaging application 206 that is presented by a processing unit 190 on a display device 224 of the source computer 102 when the messaging application 206 is executed by the processing unit 190 at the direction of the user. The user interface window 250 includes a row and column matrix 252 presenting the names of television programs provided by the source to service providers and the originally scheduled end times for the programs using program data 208 retrieved from non-volatile memory 198. Each row 254 of the matrix 252 uniquely corresponds to a single television program provided to service providers. A first column 256 of the matrix 252 corresponds to and includes the originally scheduled end time for each of the television programs. A second column 258 of the matrix 252 corresponds to and includes the name for each of the television programs. According to the example embodiment, the rows 254 of the matrix 252 (and, hence, the television programs) are sorted by the originally scheduled end times for the television programs, thereby enabling a user of the messaging application 206 to rapidly locate and select a live television program from the matrix 252 that is overrunning, or is expected to overrun, its originally scheduled end time using the window's scroll bar 260 and a pointing device 234 of the source computer 102. It should be appreciated that the rows 254 of the matrix 252 (and, hence, the television programs) may be sorted by the names of the television programs in another example embodiment.

The user interface window 250 also includes a send notice message button 262, a send program end message button 264, and an exit button 266 that may be selected by a user of the messaging application 206 via a pointing device 234. Selection of the exit button 266 causes the processing unit 190 to terminate execution of the messaging application 206. Selection of the send notice message button 262 causes the processing unit 190 to generate notice messages 112A pertaining to a previously selected live television program using and incorporating program data 208 and communication data 210. Each notice message 112A is uniquely addressed to a different respective service provider computer 110 of a service provider that receives television programs from the source. Once generated, the notice messages 112A are communicated by the processing unit 190 of source computer 102 to the respective service provider computers 110 via communication interface 216, data communication network 104, and communication links 106, 108.

Figure 10:
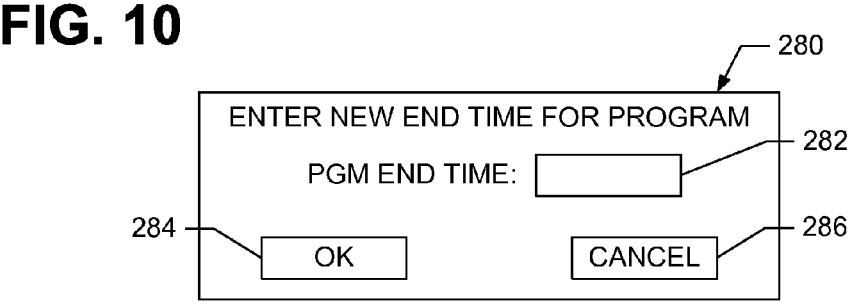
FIG. 10 displays a schematic representation of a dialog box of the messaging application of the live television program overrun management system in accordance with an example embodiment of the present invention.

Selection of the send program end message button 264 causes the processing unit 190 to display a dialog box 280 to the user of the messaging application 206 on display device 224 in order to receive a new actual or projected end time for the overrunning live television program previously selected from matrix 252. The dialog box 280, as depicted in the schematic representation of FIG. 10, includes a data entry control 282 for receiving the new actual or projected end time input by a user using the keyboard 232 of the source computer 102. The dialog box 280 also includes an okay button 284 and a cancel button 286. If the user desires to accept the new end time entered for the previously selected overrunning live television program by the user in data entry control 282 and proceed with the sending of program end messages 112B, selection of the okay button 284 causes the processing unit 190 to generate and communicate program end messages 112B with each being uniquely addressed to a different respective service provider computer 110 of a service provider that receives television programs from the source. The program end messages 112B are communicated by the processing unit 190 to the respective service provider computers 110 through communication interface 216, data communication network 104, and communication links 106, 108. If the user does not desire to proceed with the sending of program end messages 112B, selection of the cancel button 286 causes the processing unit 190 to remove the dialog box 280 from being displayed on display device 224 and to once again allow the user to make a selection of a television program or button 262, 264, 266 from user interface window 250.

Figure 11:
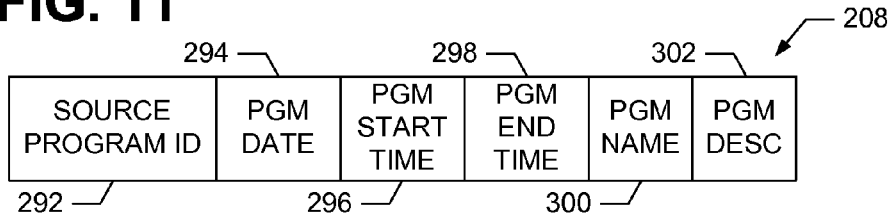
FIG. 11 displays a schematic representation of program data stored by a source computer of the live television program overrun management system in accordance with an example embodiment of the present invention.

FIG. 11 displays a schematic representation of program data 208 stored by each source computer 102, in accordance with the example embodiment, for each television program provided to service providers by the source owning and/or operating the source computer 102. Some of the program data 208 is displayed in the user interface window 250 of the messaging application 206 and is utilized in the source program overrun messages 112 produced by a source computer 102. The program data 208 for each television program includes a source program identifier 292 that is associated with and uniquely identifies the television program on a one-to-one basis. The source program identifier 292 is assigned to the television program by the television program's source and may comprise a number, character string, or mixture of numbers and characters, but must be unique within the program data 208. For each television program, the program data 208 also includes a program date 294, a program start time 296, a program end time 298, a program name 300, and a program description 302. The program date 294 comprises a calendar date on which the television program airs, while the program start and end times 296, 298 comprise the originally scheduled start and end times for the television program. The program name 300 comprises the textual name of the television program displayed in the user interface window 250 and the program description 302 comprises a brief textual description of the television program.

Figure 12:
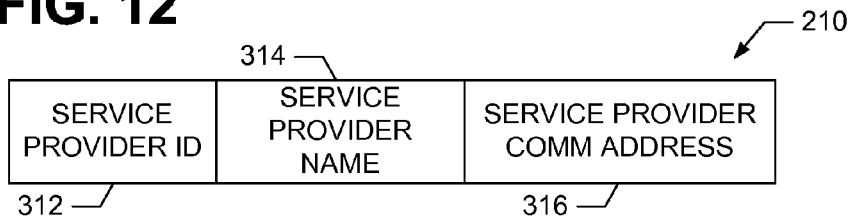
FIG. 12 displays a schematic representation of communication data stored by a source computer of the live television program overrun management system in accordance with an example embodiment of the present invention.

FIG. 12 displays a schematic representation of communication data 210 stored by each source computer 102, according to the example embodiment, for each service provider computer 110 to which the source computer 102 communicates source program overrun messages 112. The communication data 210 for and associated with each service provider computer 110 includes a service provider identifier 312, a service provider name 314, and a service provider communication address 316. The service provider identifier 312 is assigned by the source to uniquely identify the service provider owning and/or operating the service provider computer 110 to which the service provider identifier 312 applies. The service provider identifier 312 may comprise a number, character string, or mixture of numbers and characters, but must be unique within the communication data 210. The service provider name 314 comprises the textual name of the service provider that owns and/or operates the service provider computer 110. The service provider communication address 316 comprises a unique communication address for the service provider computer 110 that enables the delivery of source program overrun messages 112 in which the service provider communication address 316 is incorporated by the source computer 102. Generally, the service provider communication address 316 comprises an Internet protocol (IP) address, but may comprise any other address that is unique to the service provider computer 110 and that may be used by data communication network 104 to deliver source program overrun messages 112.

FIG. 13 displays a block diagram representation of a service provider computer 110 of a service provider in accordance with an example embodiment. The service provider computer 110 is configured with a monitoring application 346 that causes the service provider computer 110 to monitor its first communication interface 358 for the receipt of source program overrun messages 112 from source computers 102 and, in response to receiving a source program overrun message 112, to generate and communicate appropriate corresponding service provider program overrun messages 148 to communicatively connected network interface devices 146. The monitoring application 346 is described in more detail below. The service provider computer 110 also receives and stores source-channel cross reference data 348, program cross reference data 350, and channel guide data 352 that is utilized by the monitoring application 346 to produce the service provider program overrun messages 148. It should be remembered that, according to the example embodiment, each service provider has a service provider computer 110.

Each service provider computer 110 comprises one or more processing unit(s) 330 that are adapted to execute computer software instructions of an operating system 344 and other computer software as required to provide the functionality described herein. The processing unit(s) 330 may include, but not be limited to, microprocessors or other similar components. Each processing unit 330 is connected to a bus 332 by bi-directional communication paths 334 for the bi-directional communication of address, data and control signals with the bus 332. The bus 332 includes a plurality of address, data and control electrical signal paths as appropriate to communicate address, data and control electrical signals between the various components of the service provider computer 110.

Each service provider computer 110 further comprises a memory 336, including non-volatile memory 338 and volatile memory 340. The memory 336 is communicatively connected to bus 332 for the bi-directional communication of computer software instructions, addresses, data and control signals with the bus 332 and other components connected to the bus 332, through one or more bi-directional communication paths 342. Non-volatile memory 338 generally stores information and/or data that will not be lost when electrical power to the non-volatile memory 338 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 340 typically stores information and/or data for a temporary period of time, as such information and/or data that will be lost when electrical power is no longer supplied to the volatile memory 340. Examples of volatile memory include, but are not limited to, non-battery backed up random access memory devices.

According to the example embodiment, non-volatile memory 338 stores a plurality of computer software instructions of an operating system 344 that, when delivered to and executed by a processing unit 330, enable the processing unit 330 and other service provider computer components to perform various actions and provide the basic functionality necessary to implement the methods described herein. Non-volatile memory 338 also stores computer software instructions of a monitoring application 346, which when communicated to and executed by a processing unit 330, causes the service provider computer 110 to operate according to the monitoring application 346, thereby implementing the methods and functions of the monitoring application 346 described in more detail below. Additionally, non-volatile memory 338 stores source-channel cross reference data 348 that enables the service provider computer 110 to determine the service provider's channel number and channel name corresponding to each source from which the service provider receives television programs. In addition, non-volatile memory 338 stores program cross reference data 350 that allows the service provider computer 110 to look up a service provider program identifier 414 assigned by the service provider to a television program that corresponds to a respective source program identifier 292 assigned by the source of the television program. Further, non-volatile memory 338 stores channel guide data 352 for each of the service provider's television channels that is downloaded periodically to each communicatively connected network interface device 146 and that is used in program update messages 148B to update channel guide data stored locally by each network interface device 146 when a live television program overruns its originally scheduled end time. Non-volatile memory 338 further stores communication data 354 for each network interface device 146 that is used by the service provider computer 110 to address and communicate service provider program overrun messages 148 to network interface devices 146 communicatively connected to the service provider computer 110 via service provider communication network 140 and communication links 142, 144. Still further, non-volatile memory 338 stores non-volatile data 355 that is used by a processing unit 330 during execution of the operating system 344 and the monitoring application 346.

Volatile memory 340 stores volatile data 356 that is created and/or used by the operating system 344 or monitoring application 346 during execution. Volatile data 356 may include, for example, source-channel cross reference data 348, program cross reference data 350, and/or channel guide data 352 retrieved from non-volatile memory 338. Volatile data 356 may also include, for example, source program overrun messages 112 received from a source computer 102, service provider program overrun messages 148 generated for communication to network interface devices 146, and intermediate data produced by execution of the operating system 344 and/or monitoring application 346.

Each service provider computer 110 also comprises first and second communication interfaces 358, 360 that connect to bus 332 via respective communication paths 362, 364 for the bi-directional communication of address, data and control signals therebetween. The first communication interface 358 connects the service provider computer 110 for the bi-directional communication of messages, information, data, and/or signals with source computers 102 via communication links 108, data communication network 104, and communication links 106. The second communication interface 360 connects the service provider computer 110 to network interface devices 146 for the bi-directional communication of messages, information, data, and/or signals via communication links 142, service provider communication network 140, and communication links 144.

In accordance with the example embodiment, each service provider computer 110 additionally comprises a display interface 366 connected to bus 332 via communication path 368 for the bi-directional communication of addresses, data and/or control signals with the bus 332 and various components connected to the bus 332. A display device 370 is connected to the display interface 366 via communication path 372 for the receipt and display of video or image signals received from the display interface 366. Similarly, an input device interface 374 is connected to bus 332 via communication path 376 for the bi-directional communication of addresses, data and/or control signals with the bus 332 and various components connected to the bus 332. A keyboard 378 and pointing device 380 are, respectively, connected to the input device interface 374 via respective communication paths 382, 384 for the receipt of input from a user of the service provider computer 110 and for the communication of data representative of such input to the input device interface 374. A power supply 386 is connected to bus 332 via electrical signal path 388 to supply electrical energy to the bus 332 and components connected to the bus 332 that is necessary for their operation.

FIG. 14 displays a schematic representation of source-channel cross reference data 348 stored in each service provider computer's non-volatile memory 338 according to an example embodiment. The source-channel cross reference data 348 is used by a processing unit 330 of a service provider computer 110 when a source program overrun message 112 is received from a source computer 102 to determine the television channel number and channel name of the service provider to which the source program overrun message 112 pertains. To do so, the processing unit 330 extracts the source identifier 118 from the received notice message 112A or the source identifier 128 from the received program end message 112B, as the case may be, and uses it as an index for the source-channel cross reference data 348 to ascertain the service provider's corresponding channel number and channel name for the source.

For each source from which the service provider receives television programs, the source-channel cross reference data 348 includes a source identifier 400 that is unique to the source and within the source-channel cross reference data 348. The source identifier 400 may comprise a number, character string, or mixture of numbers and characters. The source-channel cross reference data 348, as alluded to above, further includes a service provider channel number 402 and a service provider channel name 404 that correspond in one-to-one correspondence with the source identifier 400. The service provider channel number 402 and service provider channel name 404 correspond to the channel number 154 present in the notice message 148A described above with respect to FIG. 6, to the channel number 160 and channel name 162 present in the program update message 148B described above with respect to FIG. 7, and to the service provider channel number 430 and service provider channel name 432 present in the channel guide data 352 described in more detail below with respect to FIG. 16. Through use of the source-channel cross reference data 348, the system 100 provides mapping of television program sources to channel numbers and channel names, thereby allowing a first service provider to reference a particular source by a first channel number and first channel name and allowing a second service provider to reference the same source by a second channel number and second channel name.

FIG. 15 displays a schematic representation of program cross reference data 350, in accordance with an example embodiment, that is stored in each service provider computer's non-volatile memory 338. The program cross reference data 350 enables a processing unit 330 of a service provider computer 110 to determine the service provider program identifier 414 used internally by the service provider computer 110 and network interface devices 146 to reference a television program based on, and corresponding to, the source program identifiers 120, 130 present, respectively, in notice messages 112A and program end messages 112B received by the service provider computer 110 and referring to the television program. By virtue of the program cross reference data 350, the processing unit 330 is able to map the source program identifiers 120, 130 employed by a source in connection with a television program to the program identifier 414 used by the service provider in connection with the television program.

For each television program received from television program sources, the program cross reference data 350 includes a source identifier 410 and a source program identifier 412. The source identifier 410 corresponds on a one-to-one basis with and uniquely identifies the source of the television program and the source program identifier 412 comprises an identifier for the television program that is used and assigned by the source to uniquely identify the program. The source identifier 410 and source program identifier 412 correspond to the source identifiers 118, 128 and source program identifiers 120, 130 present, respectively, in source notice messages 112A and source program end messages 112B.

The program cross reference data 350 for each television program also includes a service provider program identifier 414, a program name 416, and a program description 418. The service provider program identifier 414 comprises data uniquely identifying the television program to the service provider computer 110 and to the network interface devices 146 communicatively connected to the service provider computer 110. The program name 416 and program description 418 comprise, respectively, a textual name and brief textual description for the television program used in channel guides, pop up program reminders, and digital video recording session schedule data. The service provider program identifier 414, program name 416, and program description 418 are incorporated in channel guide data 352 (see FIG. 16) stored and used by the service provider computer 110 and each network interface device 146 and in pop up program reminder data 488 (see FIG. 19) and digital video recording session schedule data 490 (see FIG. 20) stored and used by each network interface device 146.

FIG. 16 displays a schematic representation, according to an example embodiment, of channel guide data 352 that is stored in each service provider computer's non-volatile memory 338 for downloading to network interface devices 146 and channel guide data 486 that is received and stored in each network interface device's non-volatile memory 478. The channel guide data 352 includes data that is displayed on a subscriber's presentation device 176 by a network interface device 146 connected thereto as illustrated in FIG. 1. More specifically, for each television program on a service provider channel, the channel guide data 352 comprises a service provider channel number 430 and service provider channel name 432 that, respectively, correspond to and are the same as the service provider channel number 402 and service provider channel name 404 present in the source-channel cross reference data 348 for each television program source. The service provider channel number 430 and service provider channel name 432, respectively, comprise a number and an associated textual name that uniquely identify a television channel on which television programs from a particular source are provided to subscribers by a service provider. For example and limitation, a service provider might provide television programs from ESPN on its channel 46. Thus, the service provider channel number 430 for such television programs might be "46" and the associated service provider channel name would be "ESPN".

For each television program, the channel guide data 352 also includes program specific data such as a program date 434, a service provider program identifier 436, program start and end times 438, 440, a program name 442, and a program description 444. The program date 434 comprises the calendar date on which the program airs on the service provider channel number 430. The service provider program identifier 436 comprises data uniquely identifying the television program within the channel guide data 352 and to the service provider computer 110 and the network interface devices 146 communicatively connected to the service provider computer 110. The service provider program identifier 436 corresponds to the service provider program identifier 414 present in the program cross reference data 350. The program start and end times 438, 440 comprises data corresponding to the currently scheduled starting and ending air times for the television program. The program name 442 and program description 444 comprise textual data representing a name and brief description for the television program that correspond, respectively, to the program name 416 and program description 418 of the program cross reference data 350 for the television program.

FIG. 17 displays a schematic representation of communication data 354, in accordance with an example embodiment, that is stored in each service provider computer's non-volatile memory 338. The communication data 354 is utilized by the service provider computer 110 in addressing service provider program overrun messages 148 for communication to network interface devices 146. The communication data 354 includes data for each network interface device 146 to which the service provider computer 110 sends service provider program overrun messages 148.

For each network interface device 146, the communication data 354 includes a network interface device identifier 450, a device type code 452, a serial number 454, a subscriber identifier 456, and a communication address 458. The network interface device identifier 450 comprises data assigned by the service provider to uniquely identify the network interface device 146. The network interface device identifier 450 may include a number, character string, or mixture of numbers and characters, but must be unique within the communication data 354. The device type code 452 comprises data identifying the network interface device's particular type, as the service provider computer 110 may communicate with many different types of network interface devices 146. The serial number 454 comprises data corresponding to the serial number assigned to the network interface device 146 by the manufacturer thereof. The subscriber identifier 456 includes data uniquely identifying the service provider's subscriber who uses the network interface device 146. The communication address 458 comprises data corresponding to a unique communication address for the network interface device 146 to which service provider program overrun messages 148 may be addressed and delivered only to the network interface device 146. According to the example embodiment, the communication address 458 may comprise the media access control (MAC) address uniquely associated with the network interface device 146.

Figure 18:
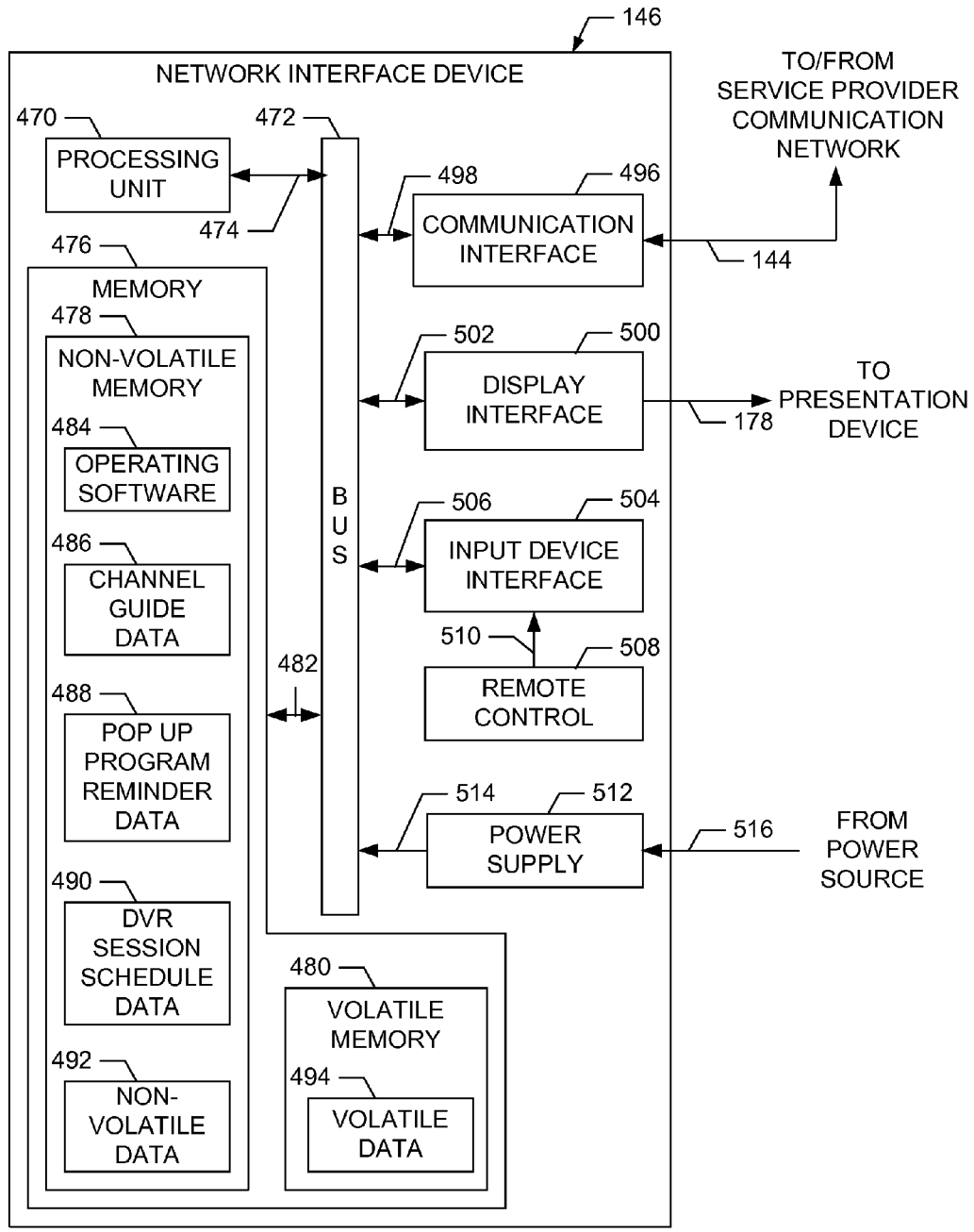
FIG. 18 displays a block diagram representation of a network interface device of the live television program overrun management system in accordance with an example embodiment of the present invention.

FIG. 18 displays a block diagram representation of a network interface device 146 in accordance with an example embodiment. The network interface device 146 is configured with operating software 484 that causes the network interface device 146 to monitor its communication interface 496 for the receipt of service provider program overrun messages 148 from the service provider computer 110 to which it is communicatively connected. In response to receiving a service provider program overrun message 148 and based on the particular program overrun message 148 received, the network interface device 146: disables the generation of pop up program reminders and the performance of digital video recording sessions previously configured for the network interface device 146; updates channel guide data 486, pop up program reminder data 488, and digital video recording session schedule data 490 stored in non-volatile memory 478 of the network interface device 146; and, re-enables the generation of updated pop up program reminders and performance of digital video recording sessions. The network interface device 146, acting under the control of the operating software 484, also enables a user of the network interface device 146 to view channel guide data 486 in a channel guide (see FIG. 1) and to create, edit and delete pop up program reminders and digital video recording sessions, and generates pop up program reminders (see FIG. 2) and performs digital video recording as configured. The operating software 484 is described in more detail herein. Additionally, the network interface device 146 receives data representative of television programs, movies, and/or other multimedia content from the service provider via service provider communication network 140, generates electrical signals corresponding to such data, and delivers such electrical signals to a connected presentation device 176 via a communication link 178, thereby causing the television programs, movies, and/or other multimedia content to be presented to a user by the presentation device 176.

Each network interface device 146 comprises one or more processing unit(s) 470 that are adapted to execute computer software instructions of operating software 484 and other computer software as required to provide the functionality described herein. The processing unit(s) 470 may include, but not be limited to, microprocessors or other similar components. Each processing unit 470 is connected to a bus 472 by bi-directional communication paths 474 for the bi-directional communication of address, data and control signals with the bus 472. The bus 472 includes a plurality of address, data and control electrical signal paths as appropriate to communicate address, data and control electrical signals between the various components of the network interface adapter 146.

Each network interface adapter 146 further comprises a memory 476, including non-volatile memory 478 and volatile memory 480. The memory 476 is communicatively connected to bus 472 for the bi-directional communication of computer software instructions, addresses, data and control signals with the bus 472 and other components connected to the bus 472, through one or more bi-directional communication paths 482. Non-volatile memory 478 generally stores information and/or data that will not be lost when electrical power to the non-volatile memory 478 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 480 typically stores information and/or data for a temporary period of time, as such information and/or data that will be lost when electrical power is no longer supplied to the volatile memory 480. Examples of volatile memory include, but are not limited to, non-battery backed up random access memory devices.

According to the example embodiment, non-volatile memory 478 stores a plurality of computer software instructions of operating software 484 that, when delivered to and executed by a processing unit 470, enable the processing unit 470 and other network interface device components to perform various actions appropriate to cause the network interface device 146 to implement the methods and functions described herein. Non-volatile memory 478 also stores channel guide data 486 that is used by the network interface device 146 under the control of the operating software 484 to cause the display of a channel guide (see FIG. 1) on a presentation device 176 communicatively connected to the network interface device 146. The channel guide data 486 comprises the same data elements and data (see FIG. 16), when updated, as that of the channel guide data 352 stored in the non-volatile memory 338 of the service provider computer 110 to which the network interface device 146 is communicatively connected as described herein.

Additionally, non-volatile memory 478 stores pop up program reminder data 488 that, when used in connection with the operating software 484, enables the network interface device 146 to generate and cause the display of pop up program reminders for television programs at an appropriate time. In addition, non-volatile memory 478 stores digital video recording session schedule data 490 that when used by the processing unit 470 operating according to the operating software 484, causes the network interface device 146 to record television programs desired for later playback and viewing on a connected presentation device 176 by a user. Further, non-volatile memory 478 stores non-volatile data 492 that is used by a processing unit 470 during execution of the operating software 484 and other software not described herein.

Volatile memory 480 stores volatile data 494 that is created and/or used by the operating software 484 or other software during execution. Volatile data 494 may include, for example, channel guide data 486, pop up program reminder data 488, and digital video recording session schedule data 490 retrieved from non-volatile memory 478. Volatile data 494 may also include, for example, service provider program overrun messages 148 received from the communicatively connected service provider computer 110 via service provider communication network 140, data corresponding to user interfaces displayed on a presentation device 176 connected to the network interface device 146, and channel guide, pop up program reminder, and digital video recording session schedule data 486, 488, 490 received and/or presented, as the case may be, via such user interfaces. Additionally, volatile data 494 may include, for example, intermediate data produced by execution of the operating software 484 and/or other software.

Each network interface device 146 also comprises a communication interface 496 that connects to bus 498 via communication path 498 for the bi-directional communication of address, data and control signals therebetween. The communication interface 496 connects the network interface device 146 for the bi-directional communication of messages, information, data, and/or signals with a service provider computer 110 via communication links 144, service provider communication network 140, and communication links 142. Service provider overrun messages 148 are received from the service provider computer 110 via communication interface 496.

In accordance with the example embodiment, each network interface device 146 additionally comprises a display interface 500 connected to bus 472 via communication path 502 for the bi-directional communication of addresses, data and/or control signals with the bus 472 and various components connected to the bus 472. A presentation device 176 is connected to the display interface 500 via communication link 178 for the receipt and display of video or image signals received from the display interface 500. Similarly, an input device interface 504 is connected to bus 472 via communication path 506 for the bi-directional communication of addresses, data and/or control signals with the bus 472 and various components connected to the bus 472. A remote control 508 is connected to the input device interface 504 via a communication path 510 for the receipt of input from a user of the network interface device 146 and for the communication of data representative of such input to the input device interface 504. A power supply 512 is connected to bus 472 via electrical signal path 514 to supply electrical energy to the bus 472 and components connected to the bus 472 that is necessary for their operation. The power supply 512 connects to an external power source via electrical signal path 516 for the receipt of electrical energy from the external power source.

Figure 19:
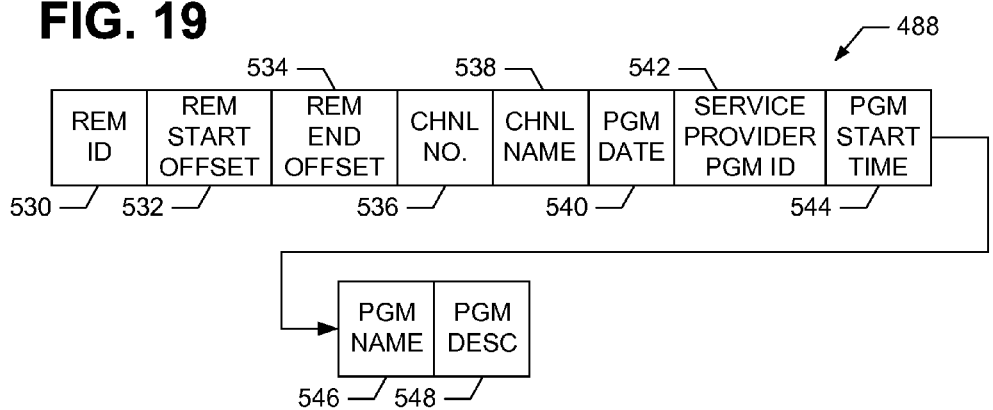
FIG. 19 displays a schematic representation of pop up program reminder data stored by a network interface device of the live television program overrun management system in accordance with an example embodiment of the present invention.

FIG. 19 displays a schematic representation of pop up program reminder data 488, in accordance with an example embodiment, that is stored in each network interface device's non-volatile memory 478. The pop up program reminder data 488 is used by a processing unit 470 of a network interface device 146 to produce and cause the display of pop up program reminders for television programs on a communicatively connected presentation device 176. The pop up program reminder data 488 is initially created and stored in non-volatile memory 478 by a processing unit 470 in response to input received from a user of the network interface device 146 via remote control 508 and a user interface generated by execution of the operating software 484. The pop up program reminder data 488 is updated by a processing unit 470 of the network interface device 146 using data received in service provider program update messages 148.

For each pop up program reminder, the pop up program reminder data 488 includes a reminder identifier 530, a reminder date 532, a reminder start offset 534 and a reminder end offset 536. The reminder identifier 530 comprises data corresponding on a one-to-one basis with and uniquely identifying the pop up program reminder to be generated by the network interface device 146. The reminder identifier 530 is used by the network interface device 146 to distinguish data for different pop up program reminders. The reminder start offset 532 and reminder end offset 534 comprise data, respectively, corresponding to the amount of time before and after the program start time 544 of a television program to which the pop up program reminder pertains and during which the pop up program reminder will be displayed on a presentation device 176 connected to the network interface device 146.

The pop up program reminder data 488 also includes, for each pop up program reminder, a channel number 536 and channel name 538. The channel number 536 comprises data identifying the service provider channel on which the television program to which the pop up program reminder pertains is provided to subscribers. Similarly, the channel name 538 comprises data corresponding to the name of the service provider channel on which the television program to which the pop up program reminder pertains is provided to subscribers. The channel number 536 and channel name 538 are typically displayed as part of the pop up program reminder (see FIG. 2).

Additionally, for each pop up program reminder, the pop up program reminder data 488 includes a program date 540, a service provider program identifier 542, a program start time 544, a program name 546, and a program description 548. The program date 540 comprises data representative of the calendar date on which the television program to which the pop up program reminder airs on the service provider channel. The service provider program identifier 542 comprises data uniquely identifying the television program that is the subject of the pop up program reminder. The program start time 544 comprises data corresponding to the currently scheduled starting time for the television program to which the pop up program reminder pertains. The program name 546 and program description 548 comprise textual data representing a name and brief description for the television program associated with the pop up program reminder.

Figure 20:
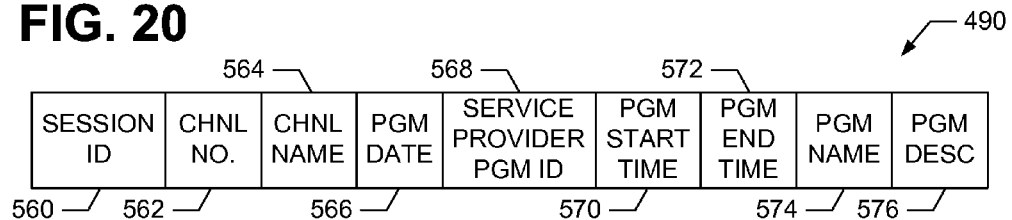
FIG. 20 displays a schematic representation of digital video recording session schedule data stored by a network interface device of the live television program overrun management system in accordance with an example embodiment of the present invention.

FIG. 20 displays a schematic representation of digital video recording session schedule data 490, according to an example embodiment, that is stored in each network interface device's non-volatile memory 478. The digital video recording session schedule data 490 is used by a processing unit 470 of a network interface device 146 to perform recording of a television program for later playback and display to a user on a presentation device 176 communicatively connected to the network interface device 146. The digital video recording session schedule data 490 is initially created and stored in non-volatile memory 478 by a processing unit 470 in response to input received from a user of the network interface device 146 via remote control 508 and a user interface generated by execution of the operating software 484. The digital video recording session schedule data 490 is updated by a processing unit 470 of the network interface device 146 using data received in service provider program update messages 148.

For each digital video recording session scheduled or configured by a user to cause recording of a television program, the digital video recording session schedule data 490 includes a session identifier 560, a channel number 562, and a channel name 564. The session identifier 560 comprises data uniquely identifying the digital video recording session from all other digital video recording sessions scheduled for the network interface device 146. The channel number 562 comprises data identifying the service provider channel on which the television program to be recorded is provided to subscribers. Similarly, the channel name 564 comprises data corresponding to the name of the service provider channel on which the television program to be recorded is provided to subscribers.

Additionally, for each digital video recording session, the digital video recording session schedule data 490 includes a program date 566, a service provider program identifier 568, a program start time 570, a program end time 572, a program name 574, and a program description 576. The program date 566 comprises data representative of the calendar date on which the television program to be recorded airs on the service provider channel. The service provider program identifier 568 comprises data uniquely identifying the television program to be recorded during the digital video recording session. The program start time 570 and program end time 572 comprise data corresponding, respectively, to the starting and ending times for the television program to be recorded. The program name 574 and program description 576 comprise textual data representing a name and brief description, respectively, for the television program to be recorded during the scheduled digital video recording session.

Figure 21:
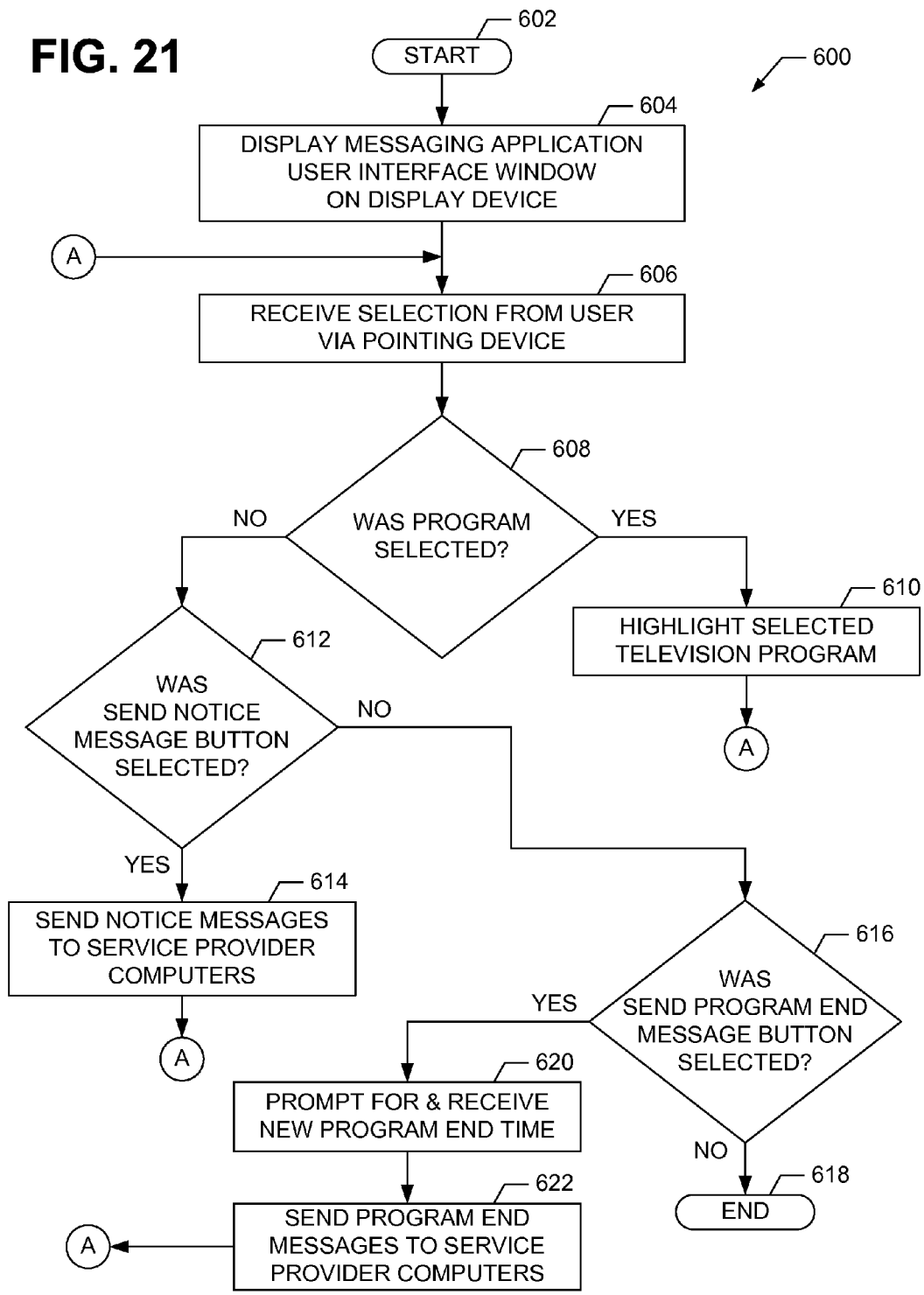
FIG. 21 displays a flowchart representation of a messaging method of the live television program overrun management system in accordance with an example embodiment of the present invention.

FIG. 21 displays a flowchart representation of a messaging method 600 according to an example embodiment. The messaging method 600 is implemented by a processing unit 190 of each source computer 102 through execution of the messaging application 206 stored in the source computer's non-volatile memory 198. Through operation in accordance with the messaging method 600, the source computer 102 provides a list of television programs for the then current date that are provided by the source to downstream service providers, receives a selection or identification of a live television program that is overrunning, or expected to overrun, its originally scheduled end time, and generates and communicates source program overrun messages 112 necessitated by the overrunning live television program to downstream service providers that receive television programs from the source. The messaging application 206 is started by a user thereof providing input to the source computer 102 directing the processing unit 190 to begin its execution.

Upon starting operation in accordance with the messaging method 600 at step 602, the processing unit 190 advances to step 604 where the processing unit 190 causes the display of the messaging application's user interface window 250 on display device 224. In displaying the user interface window 250, the processing unit 190 retrieves program data 208 from non-volatile memory 198 for the source's television programs for the then current date and causes the display of the program data 208 in matrix 252 with each row 254 constituting data for a different television program. The scheduled program end times 298 are displayed in the first column 256 of matrix 252 and the respectively corresponding program names 300 are displayed in the second column 258 of matrix 252.

Continuing at step 606 of the messaging method 600, the processing unit 190 receives input data representative of a selection of a row 254 of matrix 252 and, hence, of a particular television program, a send notice message button 262, a program end message button 264, or an exit button 266 from a user of the messaging application 206 via pointing device 234. At step 608, the processing unit 190 determines if the received input data constitutes selection of a television program by the user and, therefore, identification of a live television program that is overrunning, or is expected to overrun, its originally scheduled end time. If so, the processing unit 190 moves to step 610 of the messaging method 600 where the processing unit 190 causes the selected television program, including its scheduled program end time 298 and program name 300, to be highlighted in matrix 252. After highlighting the selected television program, the processing unit 190 loops back to step 606 of the messaging method 600 to receive further input from the user.

If, at step 608, the processing unit 190 determines that a television program was not selected by the user, the processing unit 190 advances to step 612 of the messaging method 600 where the processing unit 190 ascertains whether the received input data comprises selection of the send notice message button 262 by the user. If so, the processing unit 190 generates and sends notice messages 112A pertaining to the selected overrunning live television program to all downstream service provider computers 110 to notify them that the selected live television program is, or is expected to, overrun its originally scheduled end time and to direct them to cause connected network interface devices 146 to disable or suspend all subsequently scheduled pop up program reminders and digital video recording sessions for the channel of the live television program. In generating the notice messages 112A, the processing unit 190 retrieves data for the notice messages 112A from program data 208 and communication data 210 stored in non-volatile memory 198. Once the processing unit 190 has generated and communicated notice messages 112A to the downstream service provider computers 110, the processing unit 190 returns to step 606 to receive further input from the user.

If the processing unit 190 ascertains at step 612 that the received input data does not comprise selection of the send notice message button 262 by the user, the processing unit 190 moves ahead to step 616 of messaging method 600 where the processing unit 190 decides if the received input data corresponds to the selection of the send program end message button 264 by the user. If not, the received input data corresponded to the selection of exit button 266 and, in response, the processing unit 190 terminates execution of the messaging application 206 and operation according to the messaging method 600. Alternatively, if the processing unit 190 decides, at step 616, that the received input data corresponds to the selection of the send program end message button 264, then the processing unit 190 advances to step 620 of the messaging method 600 where the processing unit 190 prompts for and receives a new program end time for the selected television program. In prompting for the new program end time, the processing unit 190 causes the display of dialog box 280 on the display device 224 of the source computer 102. The processing unit 190 then receives input data representative of a new end time for the selected television program via data entry control 282 and keyboard 232.

After receiving the new program end time, the processing unit 190 moves to step 622 of messaging method 600 where the processing unit 190 generates and communicates program end messages 112B pertaining to the selected overrunning live television program to all downstream service provider computers 110 to provide them with a new program end time for the selected television program and to cause them to direct connected network interface devices 146 to update channel guide data 486, pop up program reminder data 488, and digital video recording session schedule data 490 stored in non-volatile memories 478 and to re-enable, or un-suspend, updated pop up program reminders and digital video recording sessions for the channel of the live television program. Next, the processing unit 190 loops back to step 606 of messaging method 600 to receive further input data from the user.

Figure 22:
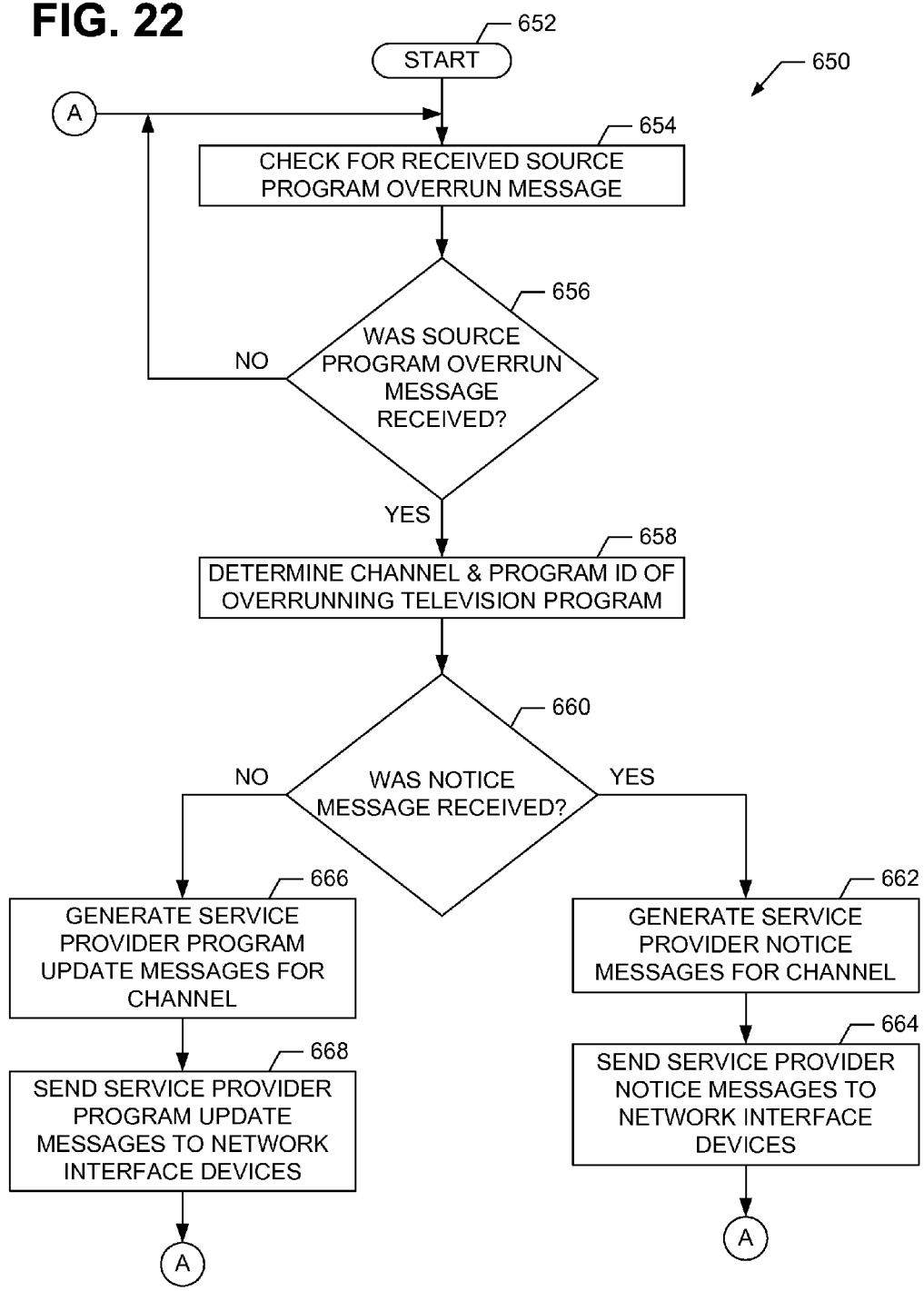
FIG. 22 displays a flowchart representation of a monitoring method of a service provider computer of the live television program overrun management system in accordance with an example embodiment of the present invention.

FIG. 22 displays a flowchart representation of a monitoring method 650 in accordance with an example embodiment. A processing unit 330 of each service provider computer 110 implements the monitoring method 650 by executing the corresponding monitoring application 346 stored by the service provider computer's non-volatile memory 338. Operating according to the monitoring method 650, each service provider computer 110 continually monitors its communication interface 358 for the receipt of source program overrun messages 112 (including, without limitation, notice messages 112A or program end messages 112B) from a source computer 102, and in response to their receipt, generates and communicates respective notice messages 148A and program update messages 148B to connected network interface devices 146. Once started, execution of the monitoring application 346 and operation according to the monitoring method 650 continues for as long as the service provider computer 110 is operating.

After starting operation according to the monitoring method 650 at step 652, the processing unit 330 advances to step 654 where the processing unit 330 checks its communication interface 358 for the receipt of a source program overrun message 112. Next, at step 656, the processing unit 330 determines if a source program overrun message 112 has been received from a source computer 102. If no source program overrun message 112 has been received, then the processing unit 330 loops back to step 654 to again check for the receipt of a source program overrun message 112. If the processing unit 330 determines, at step 656, that a source program overrun message 112 has been received, the processing unit 330 moves ahead to step 658 where the processing unit 330 determines the service provider channel on which the overrunning live television program is provided to subscribers and the service provider program identifier associated with the overrunning live television program. To do so, the processing unit 330 extracts the source identifier 118, 128, source program identifier 120, 130, and program date 122, 132 from the respective notice message 112A or program end message 112B, as the case may be. Using the appropriate source identifier 118, 128 as an index, the processing unit 330 retrieves the service provider's channel number 402 and channel name 404 for the overrunning live television program from the source-channel cross reference data 348 stored in non-volatile memory 338. Then, again using the appropriate source identifier 118, 128 and the appropriate source program identifier 120, 130 as an index, the processing unit 330 retrieves the service provider program identifier 414, program name 416, and program description 418 for the overrunning live television program from the program cross reference data 350 stored in non-volatile memory 338.

Continuing operation according to the monitoring method 650 at step 660, the processing unit 330 ascertains whether the received source program overrun message 112 comprises a notice message 112A. To do so, the processing unit 330 extracts the message type code 116, 126 from the respective received source program overrun message 112 and compares the extracted message type code 116, 126 to the message type codes respectively assigned for a notice message 112A and program end message 112B. If the extracted message type code corresponds to the message type code assigned for a notice message 112A, then the received message is a notice message 112A. If the extracted message type code corresponds to the message type code assigned for a program end message 112B, then the received message is a program end message 112B.

If, at step 660, the processing unit 330 ascertains that the received message is a notice message 112A, the processing unit 330 advances to step 662 of the monitoring method 650 where the processing unit 330 generates a service provider notice message 148A for each network interface devices 146 communicatively connected to the service provider computer 110. In doing so, the processing unit 330 retrieves a communication address 458 for each network interface device 146 from the communication data 354 stored in non-volatile memory 338 and produces a corresponding notice message 148A. The processing unit 330 inserts the retrieved service provider channel number 402 and an appropriate message type code into each notice message 148A. After generating each service provider notice message 148A, the processing unit 330 communicates the notice message 148A to the network interface device 146 via the service provider communication network 140. The processing unit 330 subsequently returns to step 654 of the monitoring method 650 to once again check for the receipt of a source program overrun message 112.

However, if the processing unit 330 ascertains, at step 660, that the received message is not a notice message 112A, then the received message is a program end message 112B and the processing unit 330 branches to step 666 to generate a series of appropriate service provider program update messages 148B as described above for each network interface device 146 communicatively connected to the service provider computer 110. To do so, the processing unit 330 extracts the new program end time 134 from the program end message 112B. Using the service provider's channel number 402, channel name 404, and service provider program identifier 414 retrieved as described above coupled with the program date 132 extracted as described above from the program end message 112B, the processing unit 330 retrieves the program start time 438, program end time 440, program name 442, and program description 444 from the channel guide data 352 for the overrunning live television program. Then, using the extracted new program end time 134, the processing unit 330 updates the channel guide data 352 for the overrunning live television program with same. Next, the processing unit 330 forms an unaddressed initial program update message 148B having a message type code 158 appropriate for the initial program update message 148B and using the new program end time 134 and data collected as described above. Subsequently, the processing unit 330 retrieves a communication address 458 for each network interface device 146 from the communication data 354 stored in non-volatile memory 338 and produces an initial program update message 148B addressed to each network interface device 146. The processing unit 330 performs similar steps to (i) update the channel guide data 352 for each of the television programs following and on the same program date and service provider channel as the overrunning live television program with revised program start and end times 438, 440 calculated relative to and using the received new program end time 134, (ii) produce intermediate program update messages 148B for each television program originally scheduled to air after the overrunning live television program, but before the last television program on the extracted program date 132 that are addressed to each network interface device 146, have a message type code 158 appropriate for an intermediate program update message 148B, and have newly calculated program start and end times based on the new program end time 134 for the overrunning live television program, and (iii) produce final program update messages 148B for the last television program originally scheduled to air on the extracted program date 132 that are addressed to each network interface device 146, have a message type code 158 appropriate for a final program update message 148B, and have newly calculated program start and end times based on the new program end time 134 for the overrunning live television program.

After generating a series of appropriate service provider program update messages 148B (including, without limitation, an initial, one or more intermediate, and final program update messages 148B) as described above for each network interface device 146, the processing unit 330 advances to step 668 of monitoring method 650 where the processing unit 330 sends the service provider program update messages 148B to the network interface devices 146 via service provider communication network 140 and communication links 142, 144. For each network interface device 146, the processing unit 330 sends the initial program update message 148B for the network interface device 146 first, the one or more intermediate program update messages 148B for the network interface device 146 next, and the final program update message 148B for the network interface device 146 last. The processing unit 330 then loops back to step 654 of monitoring method 650 to again check for the receipt of a source program overrun message 112 from a source computer 102.

Figure 23:
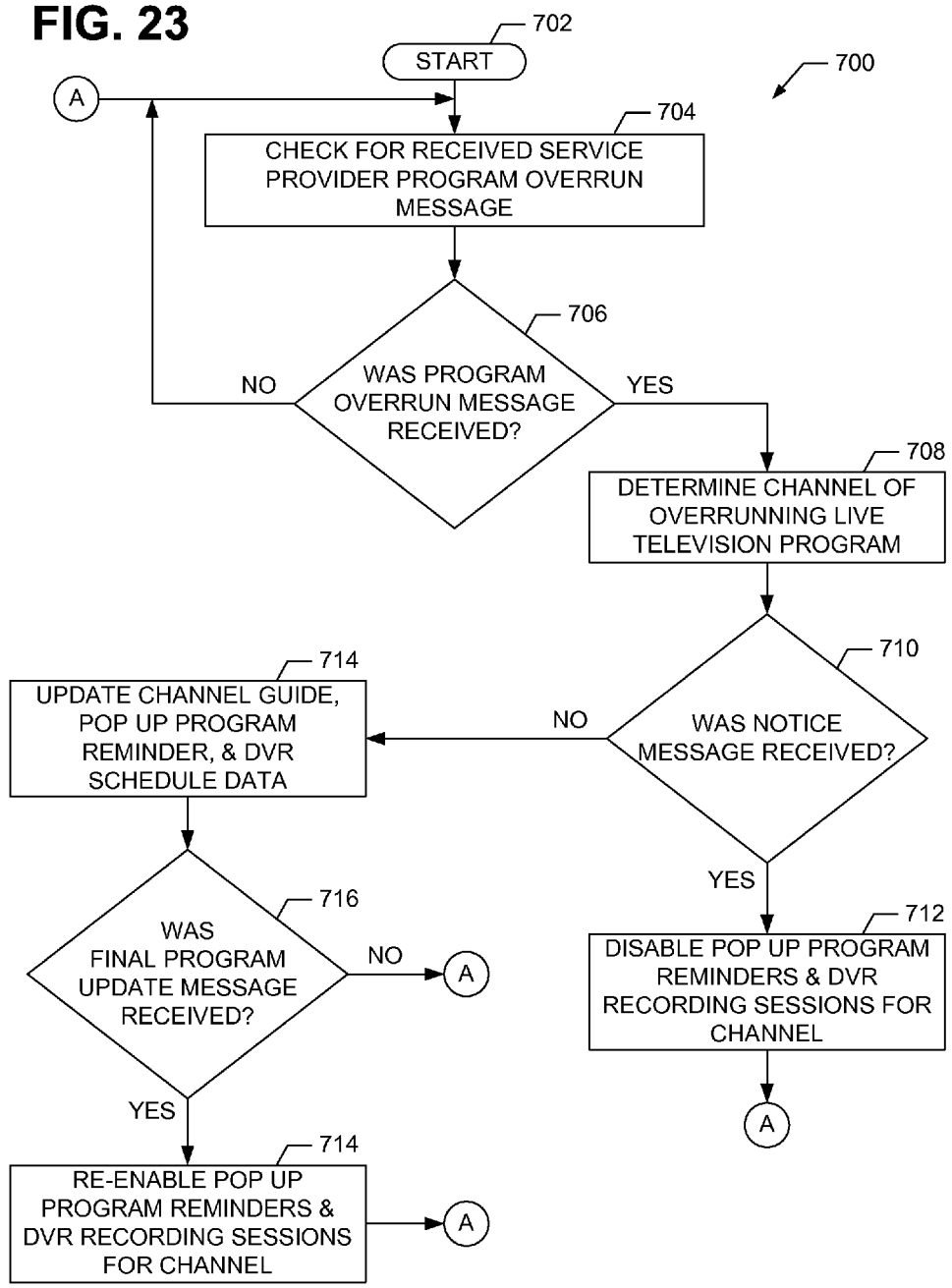
FIG. 23 displays a flowchart representation of a monitoring method of a network interface device of the live television program overrun management system in accordance with an example embodiment of the present invention.

FIG. 23 displays a flowchart representation of a monitoring method 700 according to an example embodiment. The monitoring method 700 is implemented by a processing unit 470 of each network interface device 146 through execution of the operating software 484 stored in the network interface device's non-volatile memory 478. Through operation in accordance with the monitoring method 700, the network interface device 146 receives service provider program overrun messages 148 from a respective service provider computer 110 and, depending on the particular program overrun message 148 received, disables its generation of previously configured pop up program reminders and the performance of digital video recording sessions, updates channel guide data 486, pop up program reminder data 488, and digital video recording session schedule data 490 to compensate for an overrunning live television program, and re-enables its generation of pop up program reminders and the performance of digital video recording sessions using updated pop up program reminder data 488 and digital video recording session schedule data 490, respectively. Operation of the network interface device 146 in accordance with monitoring method 700 begins upon startup or reset of the network interface device 146 and continues for as long as the network interface device 146 is powered on.

Upon starting operation in accordance with the monitoring method 700 at step 702, the processing unit 470 advances to step 704 where the processing unit 470 checks its communication interface 496 for the receipt of a service provider program overrun message 148. Next, at step 706, the processing unit 470 determines if a service provider program overrun message 148 has been received from its respective service provider computer 110. If a service provider program overrun message 148 has not been received, the processing unit 470 loops back to step 704 to again check for the receipt of a service provider program overrun message 148. If the processing unit 470 determines, at step 706, that a service provider program overrun message 148 has been received, the processing unit 470 moves ahead to step 708 where the processing unit 470 determines the service provider channel on which the overrunning live television program is provided to subscribers. To do so, the processing unit 470 extracts the channel number 154, 160 from the respective notice message 148A or program update message 148B, as the case may be.

Proceeding to step 710 of monitoring method 700, the processing unit 470 ascertains whether the received service provider program overrun message 148 constitutes a notice message 148A or a program update message 148B based on the message type code 152, 158 present in the respective service provider program overrun message 148. If the processing unit 470 ascertains that the received service provider program overrun message 148 constitutes a notice message 148A, then the processing unit 470 branches to step 712 of the monitoring method 700. At step 712, the processing unit 470 disables its generation of pop up program reminders and digital video recording sessions that have been previously set up or configured for the channel on which the overrunning live television program is provided to subscribers. Then, the processing unit 470 returns to step 704 to once again check its communication interface 496 for the receipt of a service provider program overrun message 148.

If the processing unit 470 ascertains, at step 710, that the received service provider program overrun message 148 comprises a program update message 148B, the processing unit 470 moves to step 714 of monitoring method 700 where the processing unit 470 updates the channel guide data 486, pop up program reminder data 488, and digital video recording session schedule data 490 using data extracted from the received program update message 148B. In updating such data, the processing unit 470 determines whether the program update message 148B comprises an initial, intermediate, or final program update message 148B based on the message type code 158 present in the program update message 148B. If the program update message 148B comprises an initial program update message 148B, the processing unit 470 extracts the new program end time 170 from the program update message 148B and updates the channel guide data 486, pop up program reminder data 488, and digital video recording session schedule data 490, if any, related to the overrunning live television program as appropriate. If the program update message 148B comprises an intermediate or final program update message 148B, the processing unit 470 calculates revised program start and end times for the television programs on the same channel and date as the overrunning live television program that were originally scheduled to air after the overrunning live television program and updates the channel guide data 486, pop up program reminder data 488, and digital video recording session schedule data 490, if any, for such television programs using the revised program start and end times.

Continuing at step 716 of monitoring method 700, the processing unit 470 determines if the received program update message 148B comprises a final program update message 148B by analyzing the included message type code 158. If not, the processing unit 470 loops back to step 704 of the monitoring method 700. If so, the processing unit 470 re-enables the network interface device's generation of pop up program reminders and performance of digital video recording sessions related to television programs airing after and on the same channel as the overrunning live television program based on updated pop up program reminder data 488 and digital video recording session schedule data 490, as the case may be. Then, the processing unit 470 returns to step 704 where the processing unit 470 again checks for the receipt of a service provider program overrun message 148.

FIG. 24 displays a portion of sample channel guide data 352A, 486A, in accordance with an example embodiment, at a first time before the overrunning of a live television program. The sample channel guide data 352A, 486A is stored identically in both the non-volatile memory 338 of a service provider computer 110 and the non-volatile memory 478 of a network interface device 146. The portion of the sample channel guide data 352A, 486A is illustrated in FIG.

24 with each television program 750 of the data 352A, 486A being represented by a different row 752. Each column 754 in FIG. 24 uniquely corresponds to a data element of the sample channel guide data 352A, 486A stored for each television program 750. For example, a first column 754A corresponds to channel number 430 on which the television program 750 airs, a second column 754B corresponds to a program name 442, a third column 754C corresponds to a program start time 438, and a fourth column 754D corresponds to a program end time 440.

As illustrated in FIG. 24, the sample channel guide data 352A, 486A includes data for three television programs 750A, 750B, 750C that are available for viewing by a subscriber. The first television program 750A is a live television program having a channel number 430A of "46", a program name 442A of "U.S. OPEN TENNIS", a program start time 438A of "2:00 PM", and a program end time 440A of "5:00 PM". The second television program 750B has a channel number 430B of "46", a program name 442B of "SPORTS CENTER", a program start time 438B of "5:00 PM", and a program end time 440B of "6:00 PM". The third television program 750C has a channel number 430C of "46", a program name 442C of "PRO BOWLING", a program start time 438C of "6:00 PM", and a program end time 440C of "7:00 PM".

FIG. 25 displays a portion of sample channel guide data 352B, 486B, in accordance with an example embodiment, at a second time after the overrunning of a live television program. The sample channel guide data 352B, 486B is substantially similar to sample channel guide data 352A, 486A, but illustrates the effect of the first television program 750A overrunning the originally scheduled program end time of "5:00 PM" and the result of the use and operation of the live television program overrun management system 100 as described herein.

More specifically, when the source of the first television program 750A determined that it would overrun its originally scheduled program end time 440A, a user of a source computer 102 of the source initiated execution of the messaging application 206 by the source computer 102 and directed the messaging application 206 to send notice messages 112A to downstream service provider computers 110 as described herein. Upon receiving the notice messages 112A and as also described herein, the service provider computers 110 automatically generated and communicated notice messages 148A to downstream network interface devices 146 causing them to automatically disable the generation of pop up program reminders 780A, 780B (see FIG. 26) and the performance of digital video recording sessions 790A, 790B (see FIG. 28) related to subsequent television programs 750B, 750C on the channel of the overrunning live television program 750A.

Once the source of the first television program 750A determined a new program end time for the overrunning live television program 750A, the user of the source computer 102 of the source caused the messaging application 206 to send program end messages 112B having a new program end time for the overrunning live television program 750A to downstream service provider computers 110 as described herein. After receiving the program end messages 112B and as additionally described herein, the service provider computers 110 automatically updated the channel guide data 352A stored therein to produce updated channel guide data 352B (see FIG. 25) and automatically generated and communicated program update messages 148B to downstream network interface devices 146. Receipt of the program update messages 148B caused the downstream network interface devices 146 to automatically update the channel guide data 486A, pop up program reminder data 488A (see FIG. 26), and digital video recording session schedule data 490A (see FIG. 28) for the channel of the overrunning live television program 750A to produce, respectively, updated channel guide data 486B (see FIG. 25), updated pop up program reminder data 488B (see FIG. 27), and updated digital video recording session schedule data 490B (see FIG. 29). Receipt of the program update messages 148B also caused the downstream network interface devices 146 to automatically re-enable the generation of pop up program reminders 780A, 780B and the performance of digital video recording sessions 790A, 790B related respectively to subsequent television programs 750B, 750C on the channel of the overrunning live television program 750A.

As illustrated in FIG. 25, the sample channel guide data 352B, 486B for the first television program 750A (the overrunning live television program) has been updated to reflect its new program end time of "6:00" PM. The sample channel guide data 352B, 486B for the second and third television programs 750B, 750C (and other television programs following the first television program 750A on the same channel, but not shown in FIGS. 25 and 26) have also been updated based on the new program end time of the first television program 750A. More particularly, the program start times 438B, 438C for the second and third television programs 750B, 750C have been updated to "6:00 PM" and "7:00 PM", respectively, and the program end times 440B, 440C for the second and third television programs 750B, 750C have been updated to "7:00 PM" and "8:00 PM", respectively.

Figure 26:
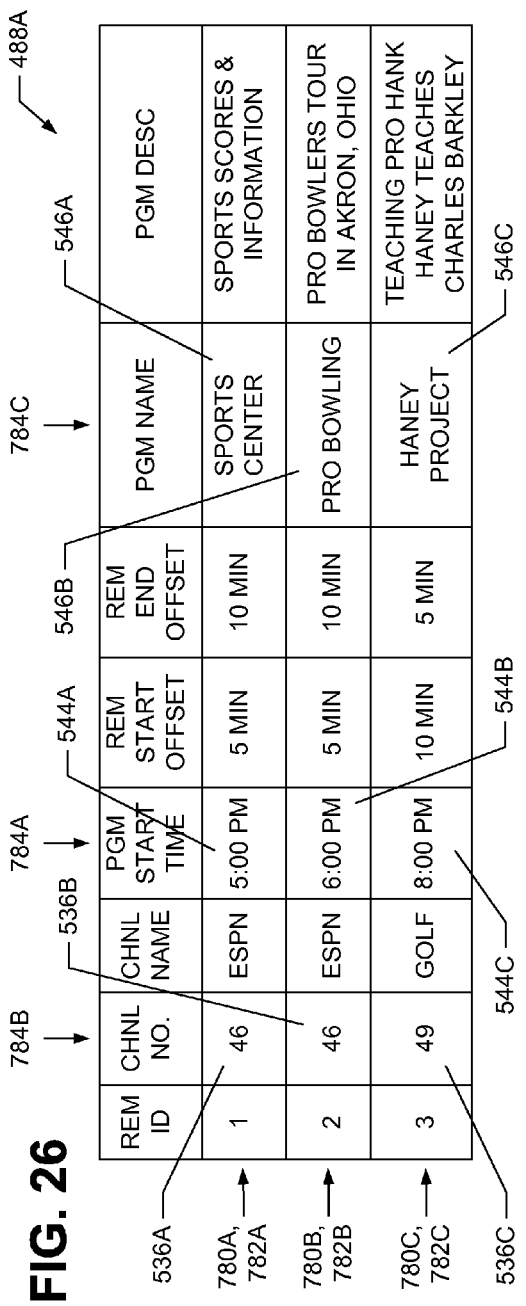
FIG. 26 displays a schematic representation of a portion of sample pop up program reminder data of the live television program overrun management system at a first time before the overrunning of a live television program in accordance with an example embodiment of the present invention.

FIG. 26 displays a portion of sample pop up program reminder data 488A, in accordance with an example embodiment, at a first time before the overrunning of a live television program. The sample pop up program reminder data 488A is stored in the non-volatile memory 478 of a network interface device 146. The portion of the sample pop up program reminder data 488A is illustrated in FIG. 26 with each row 782 of the data 488A uniquely corresponding to a different pop up program reminder 780 configured by a subscriber. Each column 784 in FIG. 26 uniquely corresponds to a data element of the sample pop up program reminder data 488A stored for each configured pop up program reminder 780. For example, a first column 784A corresponds to the program start time 544 of a television program with which a pop up program reminder 780 is associated, a second column 784B corresponds to the channel number 536 of the television program, and a third column 784C corresponds to the program name 546 of the television program.

As illustrated in FIG. 26, a subscriber has configured three pop up reminders 780A, 780B, 780C to be generated by a network interface device 146. The first pop up reminder 780A is for the second television program 750B identified with respect to the description of FIG. 24 above and has a program start time 544A of "5:00 PM", a channel number 536A of "46", and a program name 546A of "SPORTS CENTER". The second pop up reminder 780B is for the third television program 750C identified with respect to the description of FIG. 24 above and has a program start time 544B of "6:00 PM", a channel number 536B of "46", and a program name 546B of "PRO BOWLING". The third pop up reminder 780C is for a television program having a program start time 544C of "8:00 PM", a channel number 536C of "49", and a program name 546C of "HANEY PROJECT".

Figure 27:
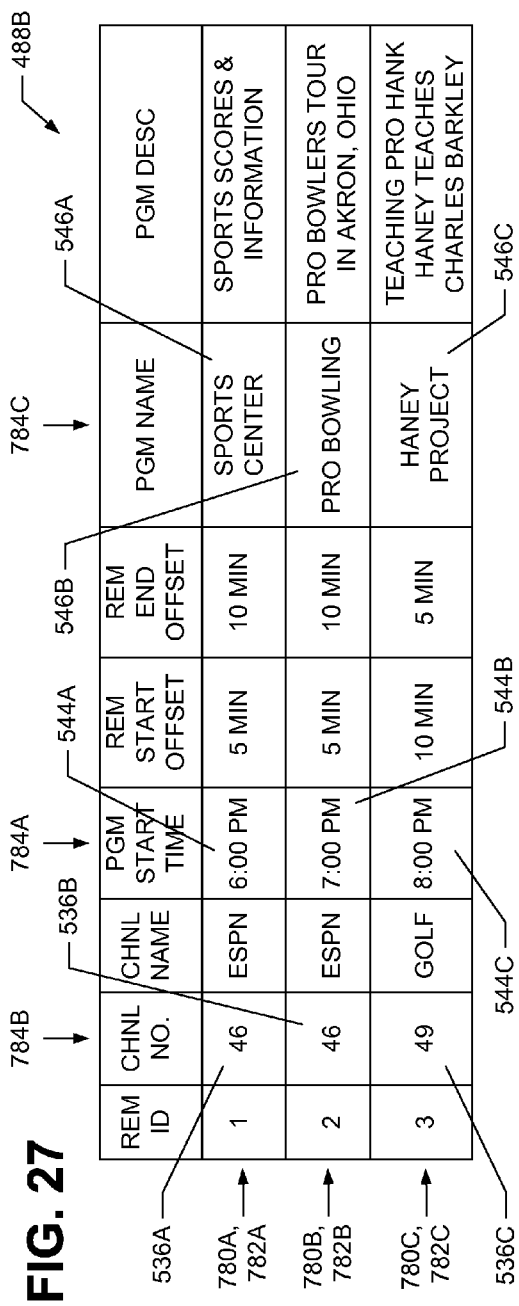
FIG. 27 displays a schematic representation of a portion of sample pop up program reminder data of the live television program overrun management system at a second time after the overrunning of a live television program in accordance with an example embodiment of the present invention.

FIG. 27 displays a portion of sample pop up program reminder data 488B, in accordance with an example embodiment, at a second time after the overrunning of a live television program. The sample pop up reminder data 488B is substantially similar to sample pop up reminder data 488A, but illustrates the effect of the first television program 750A of FIGS. 24 and 25 overrunning the originally scheduled program end time of "5:00 PM" and the result of the use and operation of the live television program overrun management system 100 as described above. More particularly and as illustrated in FIG. 27, the sample pop up program reminder data 488B for the first and second pop up program reminders 780A, 780B has been updated to reflect the revised program start times 544A, 544B for the first and second pop program reminders 780A, 780B of "6:00 PM" and "7:00 PM", respectively, based on the new program end time of the first television program 750A. Notably, the sample pop up program reminder data 488B associated with pop up program reminder 780C has not been updated because the channel number 536C for the pop up program reminder 780C is different than that of the overrunning live television program.

Figures 28, 29:
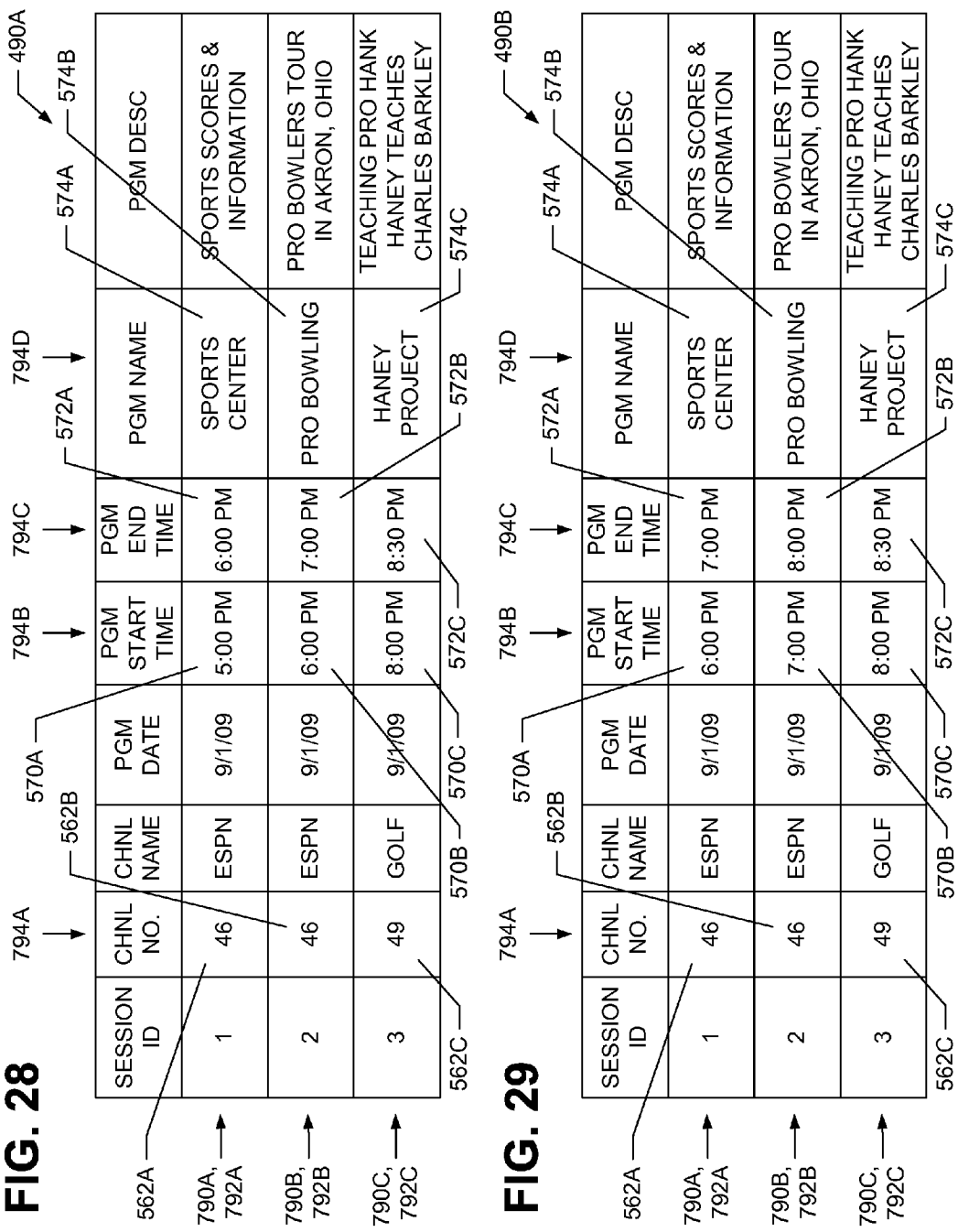
FIG. 28 displays a schematic representation of a portion of sample digital video recording session schedule data of the live television program overrun management system at a first time before the overrunning of a live television program in accordance with an example embodiment of the present invention.
FIG. 29 displays a schematic representation of a portion of sample digital video recording session schedule data of the live television program overrun management system at a second time after the overrunning of a live television program in accordance with an example embodiment of the present invention.

FIG. 28 displays a portion of sample digital video recording session schedule data 490A, in accordance with an example embodiment, at a first time before the overrunning of a live television program. The sample digital video recording session schedule data 490A is stored in the non-volatile memory 478 of a network interface device 146. The portion of the sample digital video recording session schedule data 490A is illustrated in FIG. 28 with each row 792 of the data 490A uniquely corresponding to a different digital video recording session 790 configured by a subscriber. Each column 794 in FIG. 28 uniquely corresponds to a data element of the sample digital video recording session schedule data 490A stored for each configured digital video recording session 790. For example, a first column 794A corresponds to the channel number 562 on which a television program to be recorded airs and from which recording is to be performed and second, third, and fourth columns 794B, 794C, 794D correspond, respectively, to a program start time 570, program end time 572, and program name 574 for the television program to be recorded.

As illustrated in FIG. 28, a subscriber has configured three digital video recording sessions 790A, 790B, 790C to be performed by a network interface device 146. The first digital video recording session 790A is for the second television program 750B identified with respect to the description of FIG. 24 above and has a channel number 562A of "46", program start time 570A of "5:00 PM", program end time 572A of "6:00 PM", and program name 574A of "SPORTS CENTER". The second digital video recording session 790B is for the third television program 750C identified with respect to the description of FIG. 24 above and has a channel number 562B of "46", program start time 570B of "6:00 PM", program end time 572B of "7:00 PM", and program name 574B of "PRO BOWLING". The third digital video recording session 790C is for a television program 750 having a channel number 562C of "49", program start time 570C of "8:00 PM", program end time 572C of "8:30 PM", and program name 574C of "HANEY PROJECT".

FIG. 29 displays a portion of sample digital video recording session schedule data 490B, in accordance with an example embodiment, at a second time after the overrunning of a live television program. The sample digital video recording session schedule data 490B is substantially similar to sample digital video recording session schedule data 490A, but illustrates the effect of the first television program 750A of FIGS. 24 and 25 overrunning the originally scheduled program end time of "5:00 PM" and the result of the use and operation of the live television program overrun management system 100 as described above. More particularly and as illustrated in FIG. 29, the sample digital video recording session scheduled data 490B for the first and second digital video recording sessions 790A, 790B has been updated to reflect the revised program start times 570A, 570B for the first and second digital video recording sessions 790A, 790B of "6:00 PM" and "7:00 PM", respectively, based on the new program end time of the first television program 750A. Notably, the sample digital video recording session schedule data 490B associated with digital video recording session 790C has not been updated because the channel number 562C for the digital video recording session 790C is different than that of the overrunning live television program.

Whereas the present invention has been described in detail above with respect to an example embodiment thereof, it should be appreciated that variations and modifications might be effected within the spirit and scope of the present invention, as described herein before and as defined in the appended claims.

What is claimed is:

1. A method of compensating for effects of a live television program continuing to air beyond a previously determined end time on network interface devices of a subscriber based television service provider, the method comprising the steps of:

receiving data messages at the network interface devices of the subscriber based television service provider from a service provider computer, the data messages sent from the service provider comprising source program overrun messages from a computer of a live television program source via a data communication network, the source program overrun messages pertaining to the live television program continuing to air beyond the previously determined end time and comprising:

a notice message generated to notify each service provider and its respective service provider computer when the live television program source determines that the live television program will overrun its originally scheduled end time, the notice message comprising a plurality of data elements including a service provider communication address, a notice message type code, a source identifier, a source program identifier, and a program date; and a program end message generated to provide each service provider and its respective provider computer with a new end time for the overrunning live television program, the program end message comprising a plurality of data elements including the service provider communication address, a program end message type code, the source identifier, the source program identifier, and the program date;

responsive to receiving the data messages, automatically compensating at the network interface devices of the subscriber based television service provider for the live television program continuing to air beyond the previously determined end time, wherein the network interface devices are located at subscribers' premises, wherein the step of compensating comprises automatically updating channel guide data stored at the network interface devices pertaining to a television program originally scheduled to air after the live television program, wherein the step of compensating further comprises automatically updating pop up program reminder data stored at the network interface devices pertaining to the television program originally scheduled to air after the live television program.

2. The method of claim 1, wherein the step of compensating further comprises, prior to updating the pop up reminder data, automatically disabling the generation of pop up program reminders by the network interface devices pertaining to television programs originally scheduled to air after the live television program.

3. The method of claim 2, wherein the step of compensating further comprises, after updating the pop up reminder data, automatically re-enabling the generation of pop up program reminders by the network interface devices pertaining to the television programs originally scheduled to air after the live television program.

4. The method of claim 1, wherein the step of compensating comprises automatically updating video recording session schedule data stored at the network interface devices pertaining to the television program originally scheduled to air after the live television program.

5. The method of claim 4, wherein the step of compensating further comprises, prior to updating the video recording session schedule data, automatically disabling the performance of video recording by the network interface devices of television programs originally scheduled to air after the live television program.

6. The method of claim 5, wherein the step of compensating further comprises, after updating the video recording session schedule data, automatically re-enabling the performance of video recording by the network interface devices of the television programs originally scheduled to air after the live television program.

7. A method of compensating for effects of a live television program continuing to air beyond a previously determined end time on network interface devices of a subscriber based television service provider, the method comprising the steps of:
receiving first data messages at at least one network interface device of the network interface devices of the subscriber based television service provider from a service provider computer, the data messages sent from the service provider computer comprising source program overrun messages from a computer of a live television program source, the first source program overrun messages pertaining to the live television program continuing to air beyond the previously determined end time and comprising:
a notice message generated to notify each service provider and its respective service provider computer when the live television program source determines that the live television program will overrun its originally scheduled end time, the notice message comprising a plurality of data elements including a service provider communication address, a notice message type code, a source identifier, a source program identifier, and a program date; and
a program end message generated to provide each service provider and its respective provider computer with a new end time for the overrunning live television program, the program end message comprising a plurality of data elements including the service provider communication address, a program end message type code, the source identifier, the source program identifier, and the program date; and responsive to receiving the first data messages, automatically causing the network interface devices at subscribers' premises to update second data stored at the network interface devices and related to one or more subsequent television programs to compensate for the live television program continuing to air beyond the previously determined end time,
wherein the second data comprises channel guide data for the one or more subsequent television programs originally scheduled to air after the live television program,
wherein the second data further comprises pop up program reminder data for the one or more subsequent television programs originally scheduled to air after the live television program.

8. The method of claim 7, wherein the second data comprises video recording session schedule data for the one or more subsequent television programs originally scheduled to air after the live television program.

9. The method of claim 7, wherein the step of automatically causing comprises automatically communicating an update message to the network interface devices via a communication network of the subscriber based television service provider directing the network interfaces devices to update the second data.

10. The method of claim 7, wherein the method further comprises a step of, responsive to receiving the first data messages, automatically directing the network interface devices to suspend the generation of pop up program reminders for the subsequent television programs originally scheduled to air after the live television program.

11. The method of claim 7, wherein the method further comprises a step of, responsive to receiving the first data messages, automatically directing the network interface devices to un-suspend the generation of pop up program reminders for the subsequent television programs originally scheduled to air after the live television program.

12. The method of claim 7, wherein the method further comprises a step of, responsive to receiving the first data messages, automatically directing the network interface devices to suspend the video recording of the subsequent television programs originally scheduled to air after the live television program.

13. The method of claim 7, wherein the method further comprises a step of, responsive to receiving the first data messages, automatically directing the network interface devices to un-suspend the video recording of the subsequent television programs originally scheduled to air after the live television program.

14. A system for compensating for effects of a live television program continuing to air beyond a previously determined end time on network interface devices of a subscriber based television service provider, the system comprising:
the plurality of network interface devices of the subscription based television service provider located at subscribers' premises for storing data for generating channel guides and pop up program reminders; and
a computer of the subscription based television service provider communicatively connected to each network interface device of said plurality of network interface devices via a communication network of the subscription based television service provider, said computer being adapted to send data to the network interface devices of the subscriber based television service provider in response to source program overrun messages received from a live television program source pertaining to the live television program continuing to air beyond the previously determined end time, to automatically communicate data messages to said network interface devices concerning the live television program for causing said network interface devices to update said stored data to compensate for the live television program continuing to air beyond the previously determined end time, the source program overrun messages comprising:
- a notice message generated to notify each service provider and its respective service provider computer when the live television program source determines that the live television program will overrun its originally scheduled end time, the notice message comprising a plurality of data elements including a service provider communication address, a notice message type code, a source identifier, a source program identifier, and a program date; and
- a program end message generated to provide each service provider and its respective provider computer with a new end time for the overrunning live television program, the program end message comprising a plurality of data elements including the service provider communication address, a program end message type code, the source identifier, the source program identifier, and the program date.

15. The system of claim 14, wherein said data messages comprise revised data pertaining to television programs scheduled to air after the live television program.

16. The system of claim 14, wherein said computer is further adapted to automatically communicate the data messages to said network interface devices causing said network interface devices to disable the generation of the pop up program reminders for television programs scheduled to air after the live television program.

17. The system of claim 14, wherein said computer is further adapted to automatically communicate the data messages to said network interface devices causing said network interface devices to enable the generation of the pop up program reminders for television programs scheduled to air after the live television program.

18. The system of claim 14, wherein said network interface devices are further configured to store data for performing video recording of television programs at said network interface devices, and wherein said computer is further adapted to automatically communicate the data messages to said network interface devices concerning the live television program for causing said network interface devices to disable video recording of television programs scheduled to air after the live television program.

19. The system of claim 14, wherein said network interface devices are further configured to store data for performing video recording of television programs at said network interface devices, and wherein said computer is further adapted to automatically communicate the data messages to said network interface devices concerning the live television program for causing said network interface devices to enable video recording of television programs scheduled to air after the live television program.

* * * * *